Oct. 4, 1966  A. M. J. STEPHAN  3,276,767
COLLATING MACHINE FOR SELECTING AND COLLATING CARDS
Filed Oct. 16, 1964  13 Sheets-Sheet 3

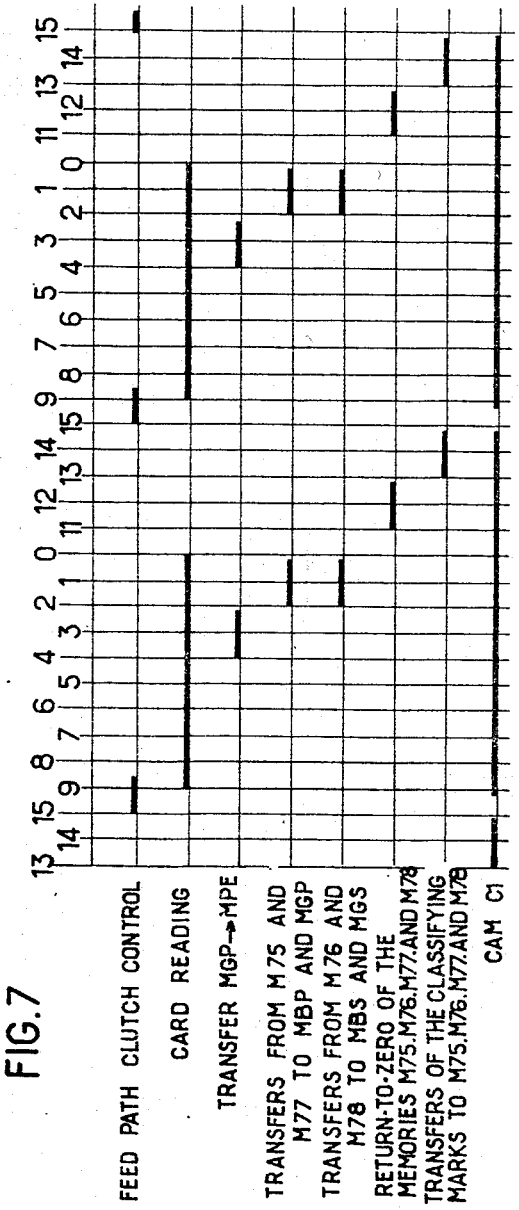

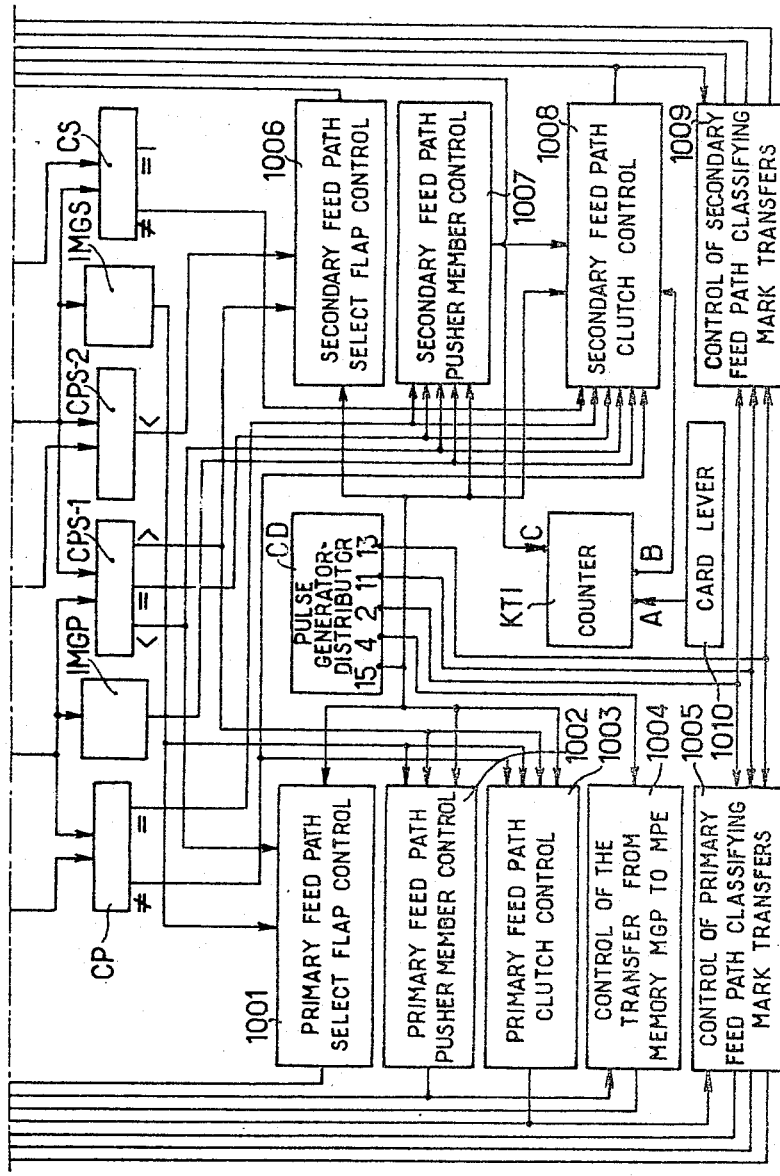

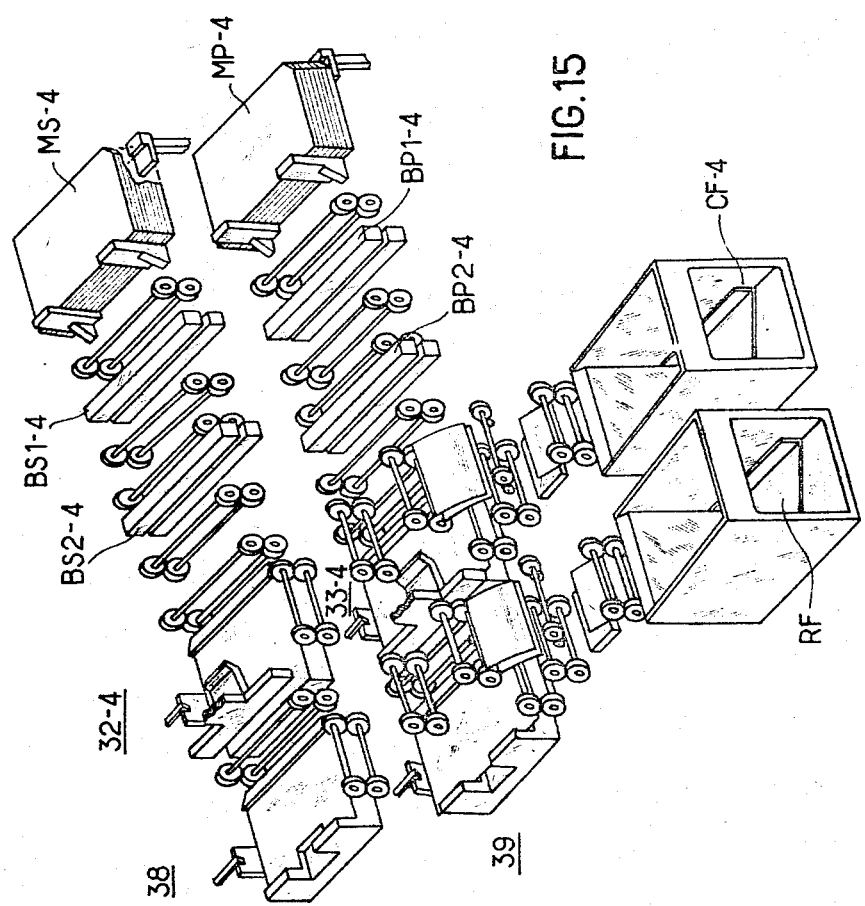

United States Patent Office 3,276,767
Patented Oct. 4, 1966

3,276,767
COLLATING MACHINE FOR SELECTING AND COLLATING CARDS
Alain Maurice Joseph Stephan, Paris, France, assignor to Compagnie des Machines Bull (Societe Anonyme), Paris, France
Filed Oct. 16, 1964, Ser. No. 404,322
Claims priority, application France, Oct. 28, 1963, 951,963, Patent 1,387,085
6 Claims. (Cl. 270—58)

The present invention relates to improvements in record-card machines intended for merging two card index systems, and more particularly to those known as collators.

Such machines are capable of merging into a single card system a card system known as the primary system, and a card system known as the secondary system, which have previously been arranged in a predetermined order, in such manner that the single card index system thus obtained is arranged in this same order, and the cards of the secondary system, bearing a given classifying mark, are collated behind the cards of the primary system bearing the same classifying mark. In order that this merge may be brought about, a collator must possess two feed paths converging towards a common receptacle, called the merge receptacle, each of these feed paths being provided with a hopper intended to receive a card system, each of the said feed paths also being provided with card scanning means, with comparison means, with selecting means and with devices for stopping the cards in the feed paths. In each of the feed paths, the cards extracted from one of the hoppers are driven towards the merge receptacle after having been successively passed, in the course of the successive cycles of the machine, through different reading stations which serve to scan the data borne by the cards. The extraction and advance of the cards along the feed paths take place under the control of appropriate members, the starting of which is determined by the result of comparisons made on the one hand between the classifying marks of two cards each travelling along a different feed path, and on the other hand between the classifying marks of two successive cards moving along the same feed path.

Collators are known in which only one card per cycle can be sent into the merge receptacle. In such machines, for regrouping the primary and secondary cards in the merge receptacle, the machine must have a number of cycles at least equal to the number of primary and secondary cards to be collated. In these machines, the merge effected in this way is called an alternate merge.

On the other hand, collators are known in which it is possible to send a primary card and a secondary card simultaneously into the merge receptacle, the primary card being positioned under the secondary card so that it is positioned in front of the secondary card in the merge receptacle. Of course, this form of merge, called simultaneous merge, is possible only when particular conditions are satisfied. In particular, the primary and secondary cards simultaneously sent into the merge receptacle must be such that the said primary card is the last card of a group of primary cards bearing the same classifying mark, while the said secondary card is the first card of a group of secondary cards bearing the same classifying mark as the said primary cards. Alternatively, the primary and secondary cards simultaneously sent into the merge receptacle must be such that the said primary card is the first card of a group of primary cards bearing the same classifying mark, while the said secondary card is the last card of a group of secondary cards bearing the classifying mark immediately below that of the said primary cards (in this case, the secondary card is positioned under the primary card). It is then found that, in order to regroup the cards bearing a given classifying mark in accordance with the simultaneous form of merge, the machine must have a number of cycles equal to the sum of the number of primary and secondary cards possessing this classifying mark, less one. This form of merge thus makes it possible effectively to increase the number of cards dealt with without modifying the speed of the machine. In the particular case where the two card index systems are such that there corresponds to each classifying mark only one primary card and one secondary card, the collation of these two card systems, carried out in accordance with the simultaneous form of merge, requires half as much time as when it is carried out in accordance with the alternate form of merge. Although this particular case only arises in practice in very exceptional circumstances, it is to be noted that in the general case the fact that the collation is effected in accordance with the simultaneous form of merge affords a saving of cycles as compared with the alternate form of merge, this saving being one cycle per classifying mark common both to at least one primary card and one secondary card. It is found that this saving is on average of the order of 10–15%.

In addition, collating machines are known in which card direction changing devices are provided in the feed paths with the object of enabling a card to be driven in different directions, any card entering one of the said direction changing devices in the forward direction being able to leave it thereafter in one of two lateral directions. In these collating machines, the cards extracted from at least one of the hoppers may be sent, by means of the said direction changing devices, to a number of receiving receptacles, one of which constitutes the merge receptacle. In some of these collating machines, the collation of a primary card and of a secondary card may take place in a direction change, either in accordance with the alternate merge method, or in accordance with the simultaneous merge method, so as to constitute a set of two cards which is then sent to the merge receptacle.

All these various types of collating machines have the disadvantage that they are not sufficiently rapid to perform the usual collating operations.

The present invention has for its object to improve the processing conditions and makes it possible to effect a very considerable increase in the number of cards processed in a given time, while providing a simple, robust collating machine having very high operating reliability. This increase in speed is rendered possible by the provision of a collating machine which has, in at least one of the feed paths, card storage positions by means of which it is possible to accumulate a limited number of cards conforming to the predetermined collating conditions, so as to render possible to a maximum extent the simultaneous operation of the feed paths.

One object of the present invention is to provide a collating machine comprising at least two hoppers designed to contain cards to be collated and to be selected, and a number of receiving receptacles, including at least one merge receptacle, in which machine cards emanating from at least one of the said hoppers are sent to the said merge receptacle through at least one card storage position, the said storage position comprising introduction checking means for checking the number of cards advanced into the said position, card stopping means and card ejecting means, the said introduction checking, card stopping and card ejecting means permitting of accumulating in the said storage position a limited number of cards conforming to predetermined collating conditions and of thereafter ejecting all together the cards thus accumulated, while cards emanating from at least one other hopper are sent to the said merge receptacle, in reduced sets, which may comprise only one card.

Another object of the invention is to provide a collating machine constructed in accordance with the invention, wherein the storage position consists of a direction changing device intended to accumulate cards conforming to predetermined collating conditions, the cards thus accumulated thereafter being discharged all together from the said direction changing device.

The saving of time afforded by a collating machine constructed in accordance with the invention is variable and depends essentially upon the composition of the two systems of cards to be collated. It is found that the saving of time which can be effected by means of such a collating machine is on average of the order of 15% to 20% calculated upon a collating machine designed to effect the alternate merge. By way of comparison, it will be recalled that the saving of time which can be effected by a collating machine designed to effect the simultaneous merge is on average of the order of 10% to 15% calculated upon a collating machine designed to effect the alternate merge.

A collating machine constructed in accordance with the invention is distinguished from collating machines designed to effect the alternate merge or the simultaneous merge by the fact that it is capable of simultaneously collating not only two cards in the usual way, but also entire sets of cards, and that it is capable of separating from the cards constituting the two card index systems those which are not to be collated. Such a collating machine effects what is called the group merge.

There will now be described by way of example a type of group merge collating machine, this example being intended to illustrate the description and having no limiting character. Other advantages and features of the invention will be more readily apparent from the following description, given with reference to the accompanying drawings, in which:

FIGURE 1 diagrammatically illustrates a collating machine of known type designed to effect an alternate merge or a simultaneous merge;

FIGURE 2 diagrammatically illustrates a type of collating machine designed in accordance with the invention to effect a group merge;

Figure 1:
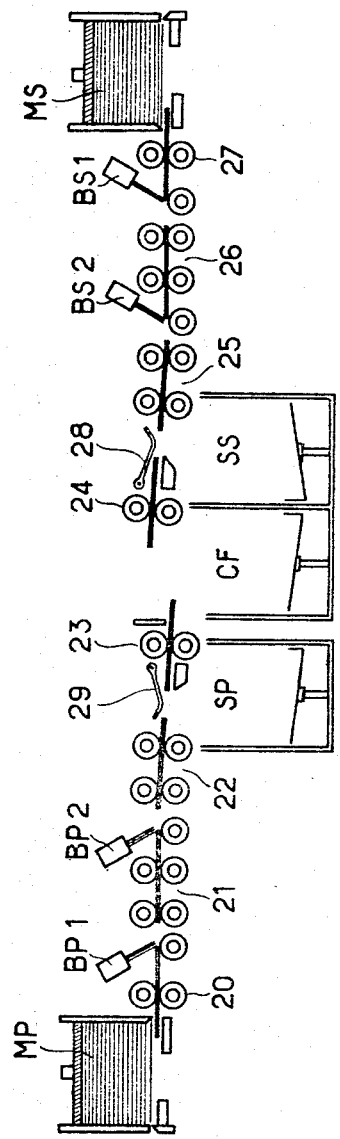
Figure 2:
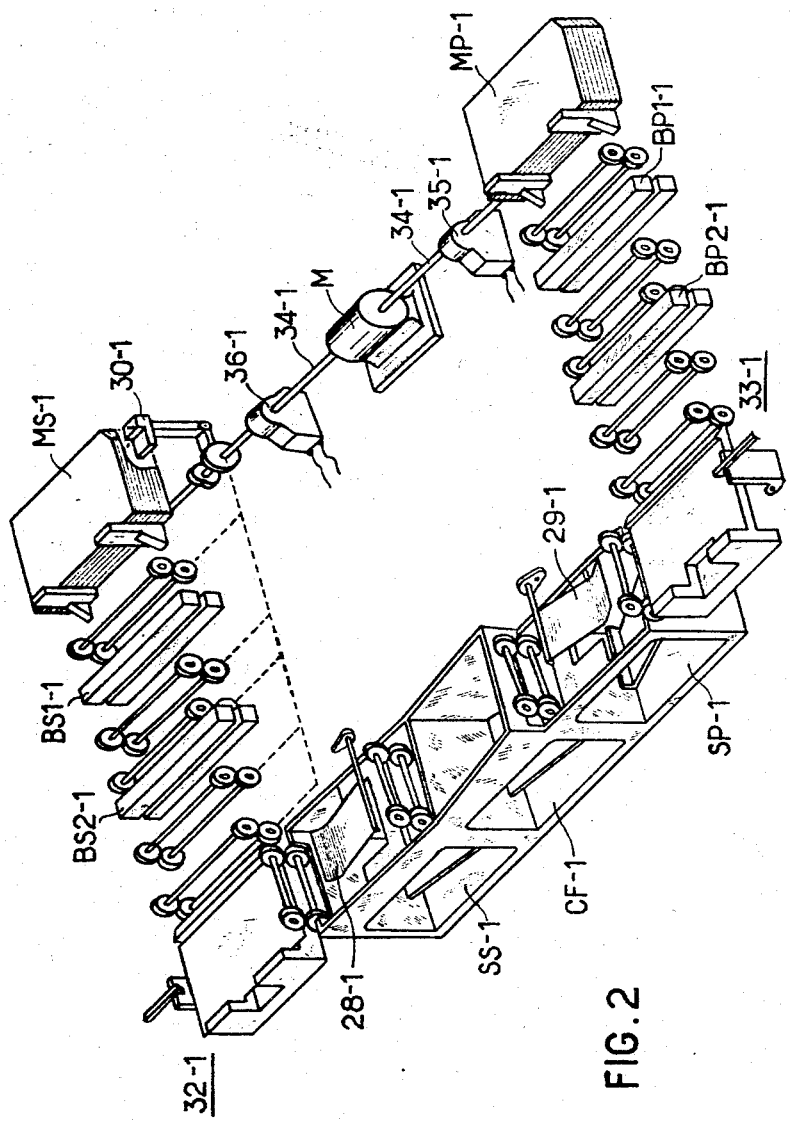
Figure 5:
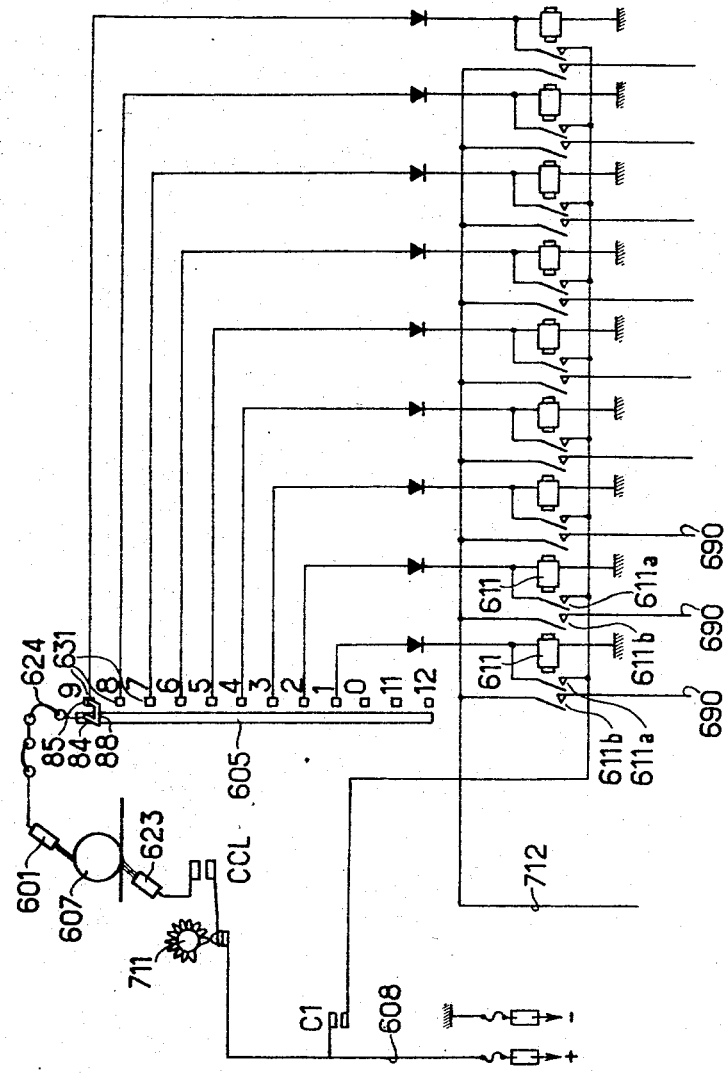
Figure 6A:
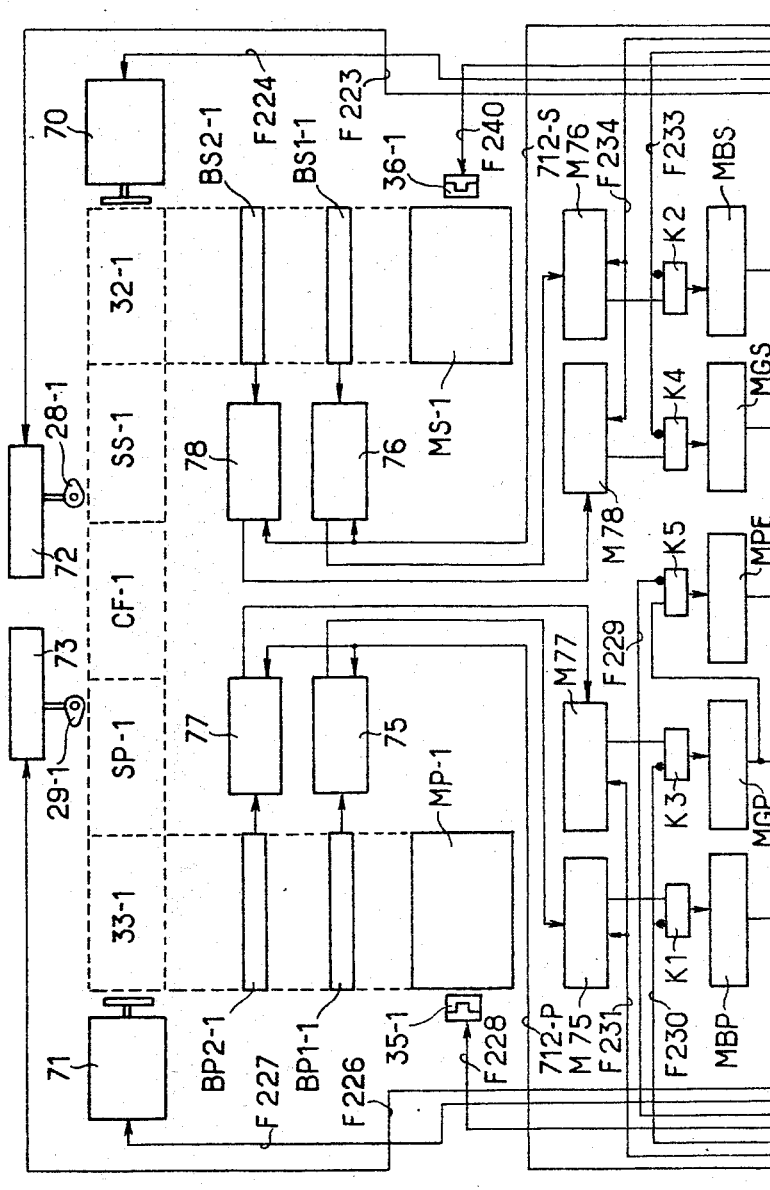
Figure 6B:
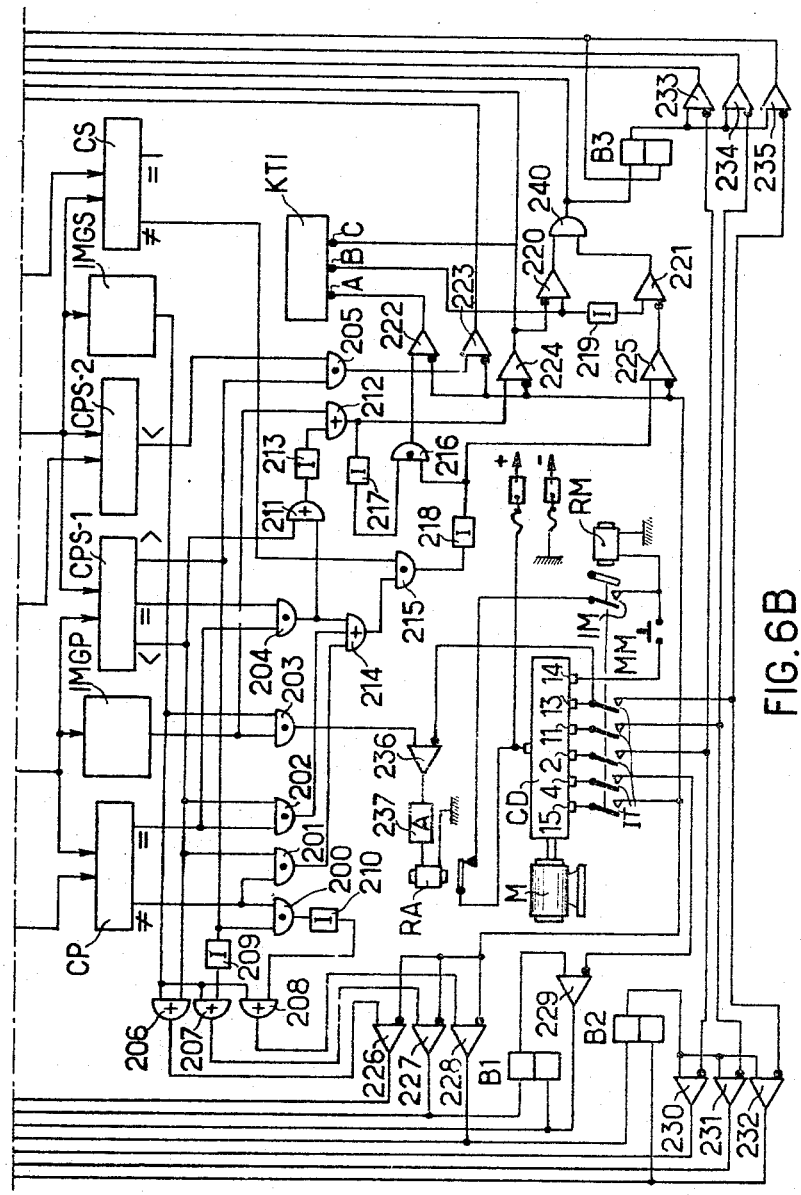
Figure 11:
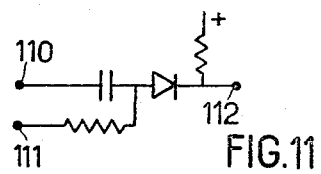
Figure 11A:
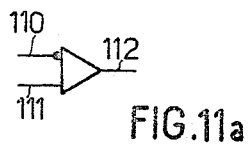
Figure 12:
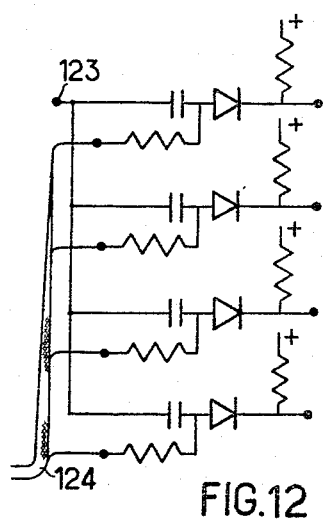
Figure 12A:
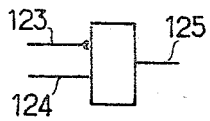
Figure 13:
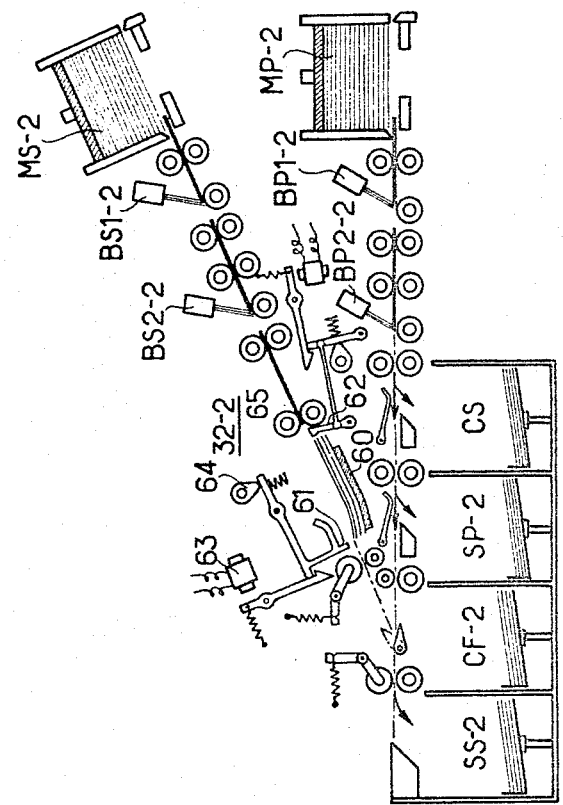
Figure 14:
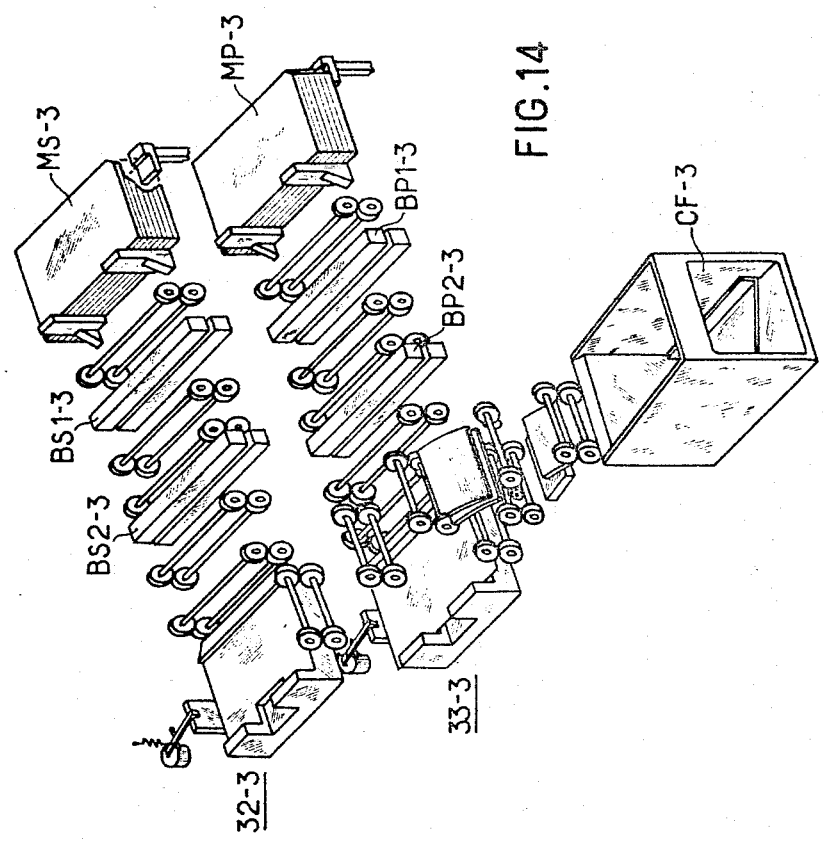

FIGURE 5 diagrammatically illustrates a part of a classifying mark recording unit;

FIGURE 6A diagrammatically illustrates some of the devices of the collating machine of FIGURE 2, assembled to enable the collating machine to perform the group merge;

FIGURE 6B diagrammatically illustrates other devices of the collating machine of FIGURE 2, assembled to enable the latter to perform the group merge;

FIGURE 6 illustrates the mode of assembly of FIGURES 6A and 6B;

FIGURE 6B1 illustrates in the form of a descriptive block diagram the logical arrangement of the collating machine of FIGURE 2 designed to perform the group merge;

FIGURE 7 indicates the chronological order and maximum duration of the main operations performed by all the devices illustrated in FIGURES 6A and 6B;

FIGURES 8 to 11 illustrate a number of elemental circuits employed in the design of some of the control devices;

FIGURES 8a to 11a illustrate the symbolic form in which the circuits of FIGURES 8 to 11 are adopted in FIGURES 6A and 6B;

FIGURE 12 illustrates a control member consisting of an assembly of a number of elemental circuits of the type illustrated in FIGURE 11;

FIGURE 12a illustrates the symbolic form in which the control member of FIGURE 12 is adopted in FIGURE 6A;

FIGURE 13 diagrammatically illustrates, in a variant, a second constructional form of a collating machine designed in accordance with the invention for performing the group merge;

FIGURE 14 diagrammatically illustrates, in a variant, a third constructional form of a collating machine designed in accordance with the invention for performing the group merge, and FIGURE 15 diagrammatically illustrates, in a variant, a fourth constructional form of a collating machine designed in accordance with the invention for performing the group merge.

*Elemental circuits*

Figure 8:
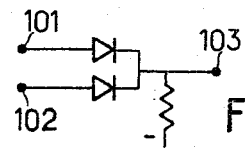
Figure 8A:
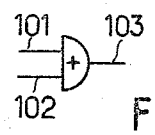

In the drawings accompanying the present description:

FIGURE 8 illustrates a logical mixer circuit known as an OR circuit. In the circuit of FIGURE 8 constructed with two diodes connected to a common output 103, which is in turn connected through an appropriate resistor to a negative voltage source (not shown), it is known that if positive voltages are applied to either one of the inputs 101 and 102 or to both, the output potential 103 rises and becomes positive. This OR circuit is symbolically represented as shown in FIGURE 8a. Although this circuit has been illustrated only with two inputs in FIGURES 8 and 8a, it is to be understood that such a circuit may comprise, depending upon the requireemnts, more than two diodes and consequently more than two inputs.

Figure 9:
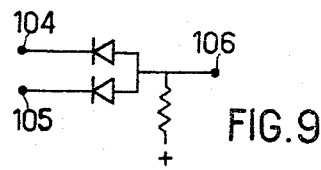
Figure 9A:
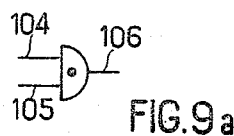

FIGURE 9 illustrates a coincidence circuit known as an AND circuit. In this circuit of FIGURE 9, which is constructed with two diodes connected to a common output 106, which is in turn connected through an appropriate resistor to a positive voltage source (not shown), it is known that if positive voltages are applied to the two inputs 104 and 105, the potential of the output 106 rises and becomes positive, while if only one of the inputs is not brought to a positive voltage, the potential of the output 106 does not rise appreciably. This AND circuit is symbolically represented as shown in FIGURE 9a. Although this circuit has been illustrated only with two inputs in FIGURES 9 and 9a, it is to be understood that such a circuit may comprise, in accordance with circumstances, more than two diodes, and consequently more than two inputs.

Figure 10:
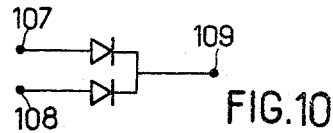
Figure 10A:
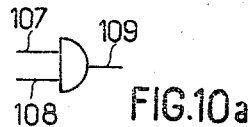

The circuit illustrated in FIGURE 10 is a mixer circuit which performs no particular logical function, but which enables positive voltages of very short duration, or positive pulses, arriving through different inputs such as 107 and 108, to be transmitted to a common output 109, so that any positive pulse arriving through one of the inputs cannot in turn react on the other inputs. This circuit is symbolically illustrated as indicated in FIGURE 10a.

FIGURE 11 illustrates a control circuit comprising two inputs 110 and 111 and one output 112, and which is intended to transmit the positive pulses necessary, in particular, for the operation of trigger circuits. One of the two inputs 110, called the pulse input and marked by a dot in FIGURE 11a to distinguish it from the other, is intended to receive a positive pulse to be transmitted. Now, it is known that when the input 111, called the control input, is brought to a positive potential, the positive pulses which arrive through the pulse input 110 are transmitted to the output 112, while if the control input 111 is not brought to a positive potential the positive pulses arriving through the input 110 are blocked. Consequently, such a control circuit may be used in two ways. On the one hand, depending upon the state of the conductor connected to the input 111, it may either permit or prevent the passage of any positive pulse arriving through the input 110. On the other hand, it may be used to control transfers. In this case, assuming that the state of a conductor brought to a positive potential represents the binary digit 1, while the state of this conductor brought to a negative potential represents the binary digit 0, it will be possible by sending a positive pulse through the input 110 either to obtain or not to obtain a pulse at the output 112, depending upon the state of the conductor connected to the input 111, the propagation of a transmitted pulse then corresponding to the transfer of a binary digit 1, while the blocking of this pulse corresponds to the binary digit 0.

FIGURE 12 illustrates a control member consisting of an assembly of control circuits connected to control simultaneous transfers of binary values, for example to control transfers of data contained in one register to another register, these data being represented, in accordance with a pre-established code, by combinations of binary digits. For this purpose, the pulse inputs of the control circuits are connected as indicated in FIGURE 12 in such manner that a pulse can be sent through a common input 123 and simultaneously transmitted by all the control circuits whose control input is brought to a positive voltage. Connected to each of the control inputs of these control circuits is a conductor whose state represents a binary digit. A datum to be transferred, represented by a combination of $p$ binary digits, will thus be represented by the state of $p$ conductors connected to the control inputs of these $p$ control circuits. It is to be noted that, although FIGURE 12 shows only four control circuits, the number of such circuits constituting a control member may be different, depending upon the binary code chosen.

Symbolically, a control member such as that of FIGURE 12 will be represented in FIGURE 6A as indicated by FIGURE 12a. It is also to be noted that, for the purpose of simplification, the set of control inputs of the circuits of FIGURE 12 have been represented by a single input 124 in FIGURE 12a, and that, similarly, the outputs of the circuits of FIGURE 12 have been symbolically represented in FIGURE 12a by a single output 125.

Other circuits are employed to form the control devices of the collator described by way of example. These circuits consist for the greater part of inverting circuits and trigger circuits. Further details of these circuits will not be given for the reason that they are now sufficiently known to require no description. It will simply be indicated that in FIGURE 6B the inverters are symbolically represented by rectangles within which the letter I has been placed.

It is to be understood that all these circuits may be constructed using, in accordance with the prior art, relays, electron tubes, diodes, transistors, magnetic cores, cryotrons or like elements.

*General arrangement*

Referring now to FIGURE 1, which shows a conventional collator designed to perform the alternate merge or the simultaneous merge of two card index systems, it is to be noted that this collator comprises primary and secondary card supply devices including a primary card hopper MP and a secondary card hopper MS, which are intended to send primary and secondary cards to receiving receptacles SP, CF and SS. The receptacle CF is the merge receptacle, while the receptacles SP and SS are called the primary select receptacle and the secondary select receptacle respectively. The cards extracted one by one from the hoppers by means of so-called picker knife and throat passage devices are driven with the edge 9 forward in the case of the primary cards and the edge 12 forward in the case of the secondary cards, to the said receptacles by means of sets of feed advance rollers 20, 21, 22, 23, 24, 25, 26 and 27, which rollers are arranged to form, on the one hand, a primary feed path between the hopper MP and the receiving receptacles, and on the other hand a secondary feed path between the hopper MS and the receiving receptacles. The primary feed path is provided, in principle, with two scanning stations BP1 and BP2 for scanning the indications borne on the primary cards. Likewise, the secondary feed path is provided with two scanning stations BS1 and BS2 for scanning the indications borne on the secondary cards. The scanning stations are connected, in principle, to comparison devices (not shown) in order to enable the machine to perform in known manner operations for the collation of the cards emanating from the two hoppers. The collated primary and secondary cards are situated, at the end of the operation, in the merge receptacle CF, while the primary cards which have not to be collated are situated in the primary select receptacle SP and the secondary cards which are not to be collated are situated in the secondary select receptacle SS. The cards are dropped into the receptacles SP and SS by select flaps 28 and 29 which, in the lowered position, produce the deflection of the cards and drop them into the said receptacles. It may be seen from FIGURE 1 that some of the primary cards coming from the hopper MP may either be ejected towards the receptacle SP by means of the flap 29 or they may continue their travel and end in the merge receptacle CF. Likewise, the secondary cards coming from the hopper MS may either be ejected towards the receptacle SS by means of the flap 28 or they may continue their travel and end in the merge receptacle CF. For the sake of clarity of the diagram, the feed paths have been shown in FIGURE 1 on either side of the receptacle CF, but in practice this arrangement is not essential. Thus, the feed paths may be disposed one above the other, or they may possess a common part, as shown in FIGURE 2 of U.S. Patent No. 2,610,736. It is to be noted that the arrangement shown in FIGURE 1 makes it possible to perform the simultaneous merge. In this case, a primary card and a secondary card are simultaneously ejected towards the merge receptacle CF, the primary card being positioned under the secondary card during the ejection as a result of a difference of level between these cards, as may be seen from FIGURE 1.

A collating machine which illustrates an example of the application of the characteristic features of the invention is diagrammatically illustrated in FIGURE 2. There will be seen in this figure at MP-1 the primary card hopper, at MS-1 the secondary card hopper, at SS-1 the secondary select receptacle, at SP-1 the primary select receptacle and CF-1 the merge receptacle. FIGURE 2 also shows the feed advance rollers for driving the cards extracted one by one from each of the hoppers by means of picker knife devices, one of which, 30-1, is shown. The secondary cards thus extracted from the hopper MS-1 are driven with the edge 9 forward, are successively scanned by two scanning stations BS1-1 and BS2-1 and enter a storage position 32-1, which will be assumed to consist, in the example under consideration, of a direction changing device. The secondary cards thus introduced into the direction changing device may thereafter leave it transversely in a manner which will hereinafter be described, and are finally directed to one of the receptacles SS-1 and CF-1. Similarly, as is shown in FIGURE 2, the primary cards extracted one by one from the hopper MP-1 are driven with the edge 9 forward, successively scanned by two scanning stations BP1-1 and BP2-1, then enter a storage position 33-1 consisting, in the present case, of a direction changing device, and then leave it transversely and are finally directed to one of the receptacles SP-1 and CF-1. Two flaps 29-1 and 28–1, when actuated, drop the primary and secondary cards respectively into the receptacles SP–1 and SS–1.

The various mechanical parts of the machine are driven off a main motor M through a main transmission shaft 34–1. The mechanisms of the primary feed path are driven by the shaft 34–1 through a clutch member 35–1. Similarly, the mechanisms of the secondary feed path are driven by the shaft 34–1 through a clutch member 36–1. These clutches are, for example, of the type described as an accessory feature in U.S. Patent No. 2,610,736, in which a driving shaft, continuoulsy rotating at a rate of one revolution per cycle during the operation of the machine, is provided with a ring formed with a recess in which there is adapted to engage under the action of a spring a pawl which is fast with the shaft of a mechanism to be driven. The said pawl is normally held out of engagement with the recess in the said ring by means of a hook which is fast with the movable armature of an electromagnet, the said hook being maintained in engagement with the said pawl under the action of a spring which moves the movable armature away from the fixed frame members of the said electromagnet. Energisation of the electromagnet causes attraction of the armature, tensions the spring of the said armature and releases the pawl which, under the action of its spring, can engage in the recess in the ring of the driving shaft and drive the mechanism. When the electromagnet is no longer energised, the hook of the armature fails and the driving pawl is maintained in movement by the hook which disengages it from the driving recess, whereby the mechanism is disengaged. The clutch member 36–1 thus permits engagement of the picker knife device 30–1 of the hopper MS–1, and of the feed advance rollers disposed between the said hopper MS–1 and the storage position 32–1. Likewise, the clutch member 35–1 permits the engagement of the picker knife device of the hopper MP–1 and of the feed advance rollers disposed between the said hopper MP–1 and the storage position 33–1. The other feed advance rollers disposed between the storage position 32–1 and the storage position 33–1, which are continuously driven by the motor M through the shaft 34–1, are in constant rotation.

It is to be noted that the machine just described operates cyclically and that the duration of a machine cycle is, for example, the time elapsing between the instant when a particular line of a card passes under a scanning station and the instant at which this same line passes under the next scanning station, if the movement of the card is not interrupted. The hoppers MP–1 and MS–1 are designed to be able to supply one card at each machine cycle, so that each time the electromagnet of the clutch device 36–1, for example, is energised at the end of a cycle, a card is extracted from the hopper MS–1 during the succeeding cycle. At the same time as the card is extracted from the hopper MS–1, the card which has previously been extracted from this hopper is read by the scanning station BS1–1. The cards may thus be advanced or stopped, depending upon whether the electromagnets of the clutch members are or are not energised. The secondary cards arrive one by one in the storage position 32–1 and it is possible, in accordance with the collating work to be performed, either to extract them one by one as they arrive or to allow them to accumulate in the said storage position and then to extract them all together from this storage position in order to despatch them to one of the receptacles SS–1 and CF–1. Similarly, the primary cards arrive one by one in the storage position 33–1 and it is possible, depending upon the collating work to be performed, either to extract them one by one from this position as they arrive, or to allow them to accumulate in this storage position and then to extract them all together from this storage position in order to despatch them to one of the receptacles SP–1 and CF–1. The devices for controlling the clutch members and the select flaps will be described a little later in the description. It is to be noted that it is not essential for the storage positions to consist, as in FIGURE 2, of direction changing devices. Other storage possibilities will be referred to a little later in the description.

*Direction changing device*

Figure 4:
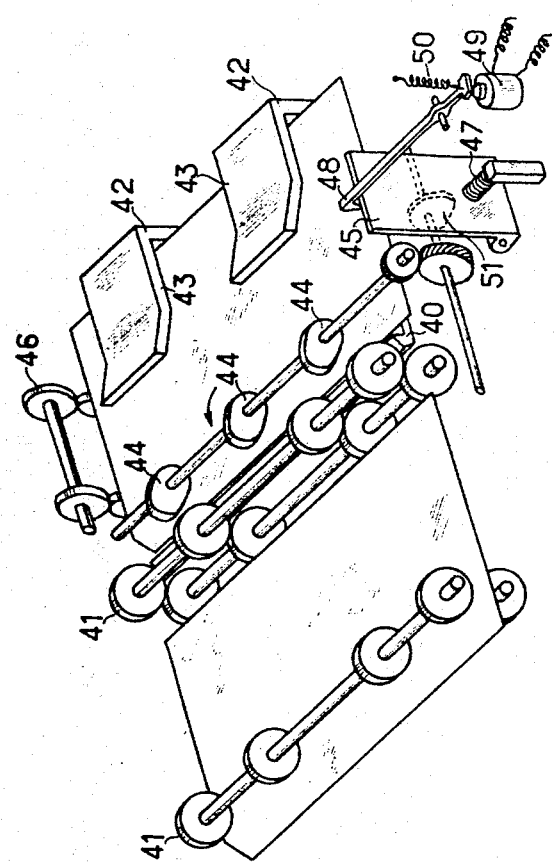
FIGURE 4 is a diagrammatic view of a direction changing device.

There will now be briefly described a direction changing device of known type employed in one embodiment of the invention for performing the card storage. It will be recalled that the use of such a device is not essential and that there may be employed to perform the card storage, for example, a receptacle of reduced capacity which is provided with a pusher device for extracting the cards one by one from the said receptacle as they arrive therein, or for allowing them to become stacked in the said receptacle and then extracting from the latter the group of cards thus formed. It will obviously be possible to replace the pusher system by another system, for example a trap system which, when actuated, causes the cards to fall out of the receptacle. The cards thus extracted are thereafter taken up in a feed path by an appropriate system. Referring now to FIGURE 4, it will be seen that a direction changing device generally comprises a bed plate 40 serving as a support for the cards arriving in the said device when they are driven by means of two sets of driving rollers 41. In order to stop the cards thus entering the direction changing device, the bed plate 40 is provided, in principle, with a pair of stops 42 comprising elements 43 which serve both to guide and to brake the cards entering the device. Downing cams 44 rotating in the direction indicated by the arrow maintain the cards already introduced into the device against the bed plate 40, so as to prevent the leading edge of a card being introduced from striking against the edges of cards which have already been introduced. The rotational movement of the downing cams is so adjusted as not to interfere with the movement of a card being introduced. The cards which thus arrive one by one in the device accumulate and form a group of cards. A pusher device 45 subject to the action of a spring 47 then pushes the group of cards thus formed towards a set of driving rollers 46, so that the said group of cards can be extracted from the device in a direction at a right angle to the direction of introduction. FIGURE 4 illustrates the pusher device 45 in the retracted position in which it enables a card to be introduced into the device. The pusher device 45 is locked in the retracted position by means of a locking armature 48 normally maintained away from the fixed frame members of an electromagnet 49 by means of a spring 50. When the electromagnet 49 is energised, the locking armature 48 is attracted, whereby the pusher member 45 is released. The spring 47 then applies the said pusher member against a cam 51 synchronised with the movement of the machine, which cam enables the pusher member during its rotation to leave its retracted position so as to push the group of cards towards the rollers 46. In the course of this movement, the pusher member obstructs the introduction path and it is necessary for it to be returned into its retracted position before the introduction of a further card into the direction changing device. As soon as the group of cards has been taken up by the rollers 46, the pusher member is returned into the retracted position by means of the cam 51 and locked in this position by the locking armature 48. The shape of the cam 51 and the position of the pusher member are made such that the pusher member can obstruct the feed path only between the instant when a card entering the device is stopped by the stops 42 and the instant when the leading edge of the following card arrives. The assembly of members 47, 48, 49, 50 and 51, which are assembled as indicated in FIGURE 4, constitutes the mechanism controlling the pusher member.

It is to be noted that the members thus described have not all been shown in FIGURE 2 in order not to overcrowd this figure. In addition, it will be indicated that in order to ensure synchronism of the machine the electromagnets of the clutch members 35–1 and 36–1, illustrated in FIGURE 2, and the electromagnets for releasing the pusher members of the direction changing devices 32–1 and 33–1 may be energised only at the same instant of a cycle. Referring again to FIGURE 2, it will be appreciated that the simultaneous energisation, at the end of a cycle, of the electromagnet of the clutch member 35–1 and of the electromagnet for releasing the pusher member of the device 32–1 thus enables a card to be extracted from the said device in the course of the succeeding cycle, while in the course of this succeeding cycle the succeeding card is introduced into the said device. It will be obvious that mere energisation of the electromagnet of the clutch member 35–1 would not have enabled the card located in the device to be extracted therefrom and that in this case this card would be accumulated with the succeeding card arriving in the device.

*Examples of construction of group-merge collators*

Collating machines designed or adapted for application of the essential features of the invention are diagrammatically illustrated in FIGURES 2, 13, 14 and 15. It is to be noted that the collating machines thus illustrated constitute only examples intended to show a number of possible constructional forms, but that any other type of collating machine performing the group merge may be adopted.

The collating machine illustrated in FIGURE 2 having already been briefly described in the foregoing, the details of this collating machine will not be further described. It is important to note that, in order to avoid any confusion, the references of some of the parts are identical in each of FIGURES 2, 13, 14 and 15, but that, in order to distinguish them, an index has been placed after each of these references, so that they are accompanied by the index 1 in FIGURE 2, by the index 2 in FIGURE 13, by the index 3 in FIGURE 14 and by the index 4 in FIGURE 15. This makes it possible to denote the same member in different figures by the same reference except for the index. Thus, for example, in FIGURE 14, MS–3 denotes the secondary card hopper and in FIGURE 13 CF–2 denotes the merge receptacle.

Referring now to FIGURE 13, there will be seen a collator in which the two feed paths are superposed and in which no direction changing is provided in the feed paths. In the collator art, such feed paths are commonly called "linear" paths. It will be noted that in FIGURE 13 the primary select receptacle SP–2 is disposed below the primary feed path, between the merge receptacle CF–2 and the primary card hopper MP–2, as in FIGURE 2, while, in contradistinction to the latter, the secondary select repectacle SS–2 is disposed, not between the merge receptacle CF–2 and the secondary card hopper MS–2, but after the said merge receptacle CF–2. This arrangement, which has been adopted for reasons of simplicity of construction of the collator, may, however, differ and is not a characteristic feature of linear-path collators. It will also be noted that the collator illustrated in FIGURE 13 has only one storage position 32–2 disposed, in the secondary feed path, between the scanning station BS2–2 and the receiving receptacles, but it would equally well have been possible without departing from the spirit of the invention to provide further storage positions in either one of the two feed paths, or in both. Finally, if necessary, further card receiving receptacles, such as the receptacles CS for example, illustrated in FIGURE 13, may be provided. Again considering FIGURE 13, it will be noted that the storage position 32–2 is composed partly of a support 60 on which the cards accumulated in the said storage position rest, of a pair of rollers 65 for driving the cards towards the storage position, of a retractable stop 61 for stopping in the said position the cards intended to be accumulated, of a pusher member 62 for extracting the cards thus accumulated from the said position and of means for controlling the operation of the pusher member and the positioning of the stop. FIGURE 13 illustrates the stop in the retracted position. An electromagnet 63 enables the stop to be positioned in the stop position for stopping the cards which are to be accumulated. A cam 64 continuously rotating at a rate of one revolution per cycle enables the stop which has been brought into the stop position to return to its retracted position. The stop is normally retained in the retracted position by means of a hook which is fast with the movable armature of the electromagnet 63. The cam 64 is so profiled and positioned that when the electromagnet 63 is energised, at a chosen instant of a cycle, the stop 61 is brought into the stop position. The instant of energisation of the electromagnet 63 is so chosen that the stop can take up the stop position before the leading edge of the card to be stopped arrives. When a card not intended to be accumulated is driven by the rollers 65, and the stop 61 is in the retracted position, the card leaves the rollers 65 and, when released, becomes engaged in the succeeding rollers. On the other hand, when a card is to be accumulated in the storage position, the stop 61 is brought into the stop position, so that when this card leaves the rollers 65 it is stopped by the stop 61 and then rests on the support 60. In this way, a number of cards can be accumulated in the same storage position so as to form a group of cards. When the group of cards thus formed is to be ejected as a whole from the storage position, the stop 61 is maintained in the retracted position and the pusher member 62 is rendered operative to push the said group of cards towards the succeeding rollers until it is driven by these rollers.

FIGURE 14 illustrates a modified construction of the collator illustrated in FIGURE 2. In the collator illustrated in FIGURE 14, the two feed paths are superposed, as in FIGURE 13, but each of them comprises a direction changing device of the same type as those illustrated in FIGURE 2 and described with reference to FIGURE 4. FIGURE 14 shows that the collator illustrated in this figure comprises only one merge receptacle CF–3, but it is to be understood that further receptacles could be provided, which would be disposed, for example, in the feed paths, between the direction changing devices and the hoppers.

FIGURE 15 illustrates another form of construction of a group merge collator. In the collator illustrated in FIGURE 15, there will be seen the arrangement adopted for the collator illustrated in FIGURE 14, but the direction changing devices 32–4 and 33–4 have been so modified that the stops of each of them are retractable and may be brought either into the stop position or into the retracted position. Moreover, in order to increase the possibilities of the machine, two other direction changing devices 38 and 39 have been mounted in the feed paths, so that a card which is not stopped by the stop of the direction changing device 32–4 enters the direction changing device 38 and, likewise, a card which is not stopped by the stop of the direction changing device 33–4 enters the direction changing device 39. The possibilities afforded by a collator arranged as indicated in FIGURE 15 are varied by virtue of the fact that it is possible to form the groups of cards in only one of the direction changing devices, or in two, three or four such devices.

It will be obvious to a person skilled in the art that the possibilities of the group merge collators may be varied at will by providing collators having the features of one or more of the collators illustrated in FIGURES 2, 13, 14 and 15. Generally speaking, there may be provided any number, at least equal to one, of card storage positions, any number, at least equal to two, of hoppers and any number of receiving receptacles. In each of these collators, the feed paths may have any form, for example linear, helical or other form, and may comprise any number of direction changing devices.

Figure 3:
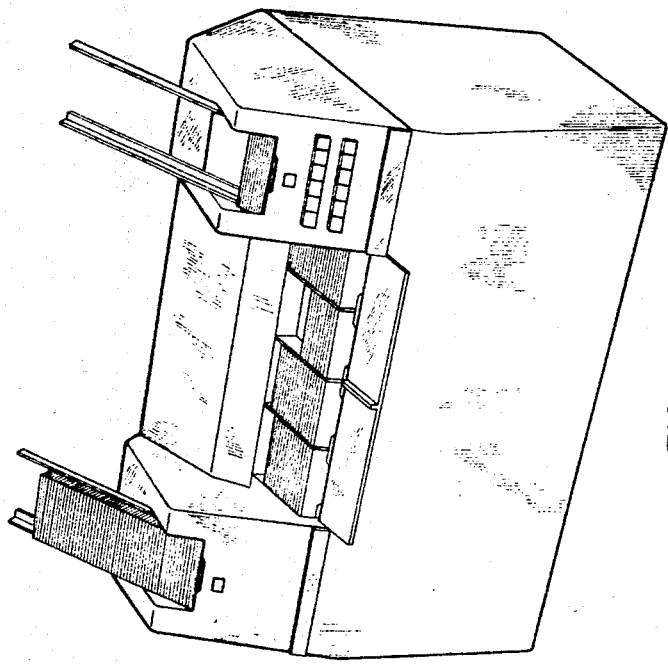
FIGURE 3 is an imaginary view of one of the forms which the collating machine designed in accordance with the invention to effect the group merge may take.

FIGURE 3 illustrates one form which may be taken by a group merge collator. The collator illustrated in FIGURE 3 utilises an arrangement similar to that illustrated in FIGURE 2 and comprises two hoppers and four receiving receptacles.

*Description of the control devices*

There will now be described by way of example the control devices employed in the type of collator illustrated in FIGURE 2, by which the latter is enabled to perform the group merge. It is to be understood that the control devices which are to be described constitute only an example used in the application of the invention and that a person skilled in the art may conceive a different arrangement from that which will now be described with reference to FIGURES 6A and 6B, assembled in the manner indicated in FIGURE 6.

Referring to FIGURES 6A and 6B, it will be seen that there have been symbolically illustrated:

At MP–1 the primary card hopper,
At MS–1 the secondary card hopper,
At BP1–1 and BP2–1 the scanning stations of the primary feed path,
At BS1–1 and BS2–1 the scanning stations of the secondary feed path,
At 33–1 the primary card storage position,
At 32–1 the secondary card storage position,
At SP–1 the primary select receptacle,
At SS–1 the secondary select receptacle,
At CF–1 the merge receptacle,
At 28–1 and 29–1 the select flaps.

As has already been stated, the storage positions 32–1 and 33–1 of the collator of FIGURE 2 consist of direction changing devices, and the collator is consequently arranged as diagrammatically illustrated in chain lines in FIGURE 6A. The pusher member of the direction changing device of the primary feed path is actuated through a control mechanism 71. Likewise, the pusher member of the direction changing device of the secondary feed path is actuated through a control mechanism 70. It will be assumed that these control mechanisms 70 and 71 are, for example, of the type illustrated in FIGURE 4 and then comprise an electromagnet similar to the electromagnet 49 which, when energised, releases the pusher member and produces the ejection of the cards situated in the direction changing device. FIGURE 6A further shows that the select flaps 28–1 and 29–1 are controlled by control systems 72 and 73 comprising electromagnets, which are so arranged that when the electromagnet of the control system 72 is energised the flap 28–1 is brought into the lowered position so as to deflect towards the receptacle SS–1 the cards which are ejected from the direction changing device 32–1. Likewise, when the electromagnet of the control system 73 is energised, the flap 29–1 is brought into the lowered position so as to deflect towards the receptacle SP–1 the cards which have been ejected from the direction changing device 33–1.

FIGURE 6A further shows in symbolic form the clutch members 35–1 and 36–1 by means of which, when their electromagnet is energised, the cards are extracted from the hoppers MP–1 and MS–1 and driven towards the direction changing devices. Thus, when the electromagnet of the clutch member 35–1 is energised, for example at the end of the cycle 5, a card is extracted from the hopper MP–1 in the course of the cycle 6. If this same electromagnet is re-energised at the end of the cycle 6, the card which has been extracted is read in the course of the cycle 7 by the scanning station BP1–1. Further energisation of this electromagnet at the end of the cycle 7 will enable this card to be read in the course of the cycle 8 by the scanning station BP2–1. If this electromagnet is reenergised at the end of the cycle 8, this card will be introduced into the direction changing device 33–1 in the course of the cycle 9. If the electromagnet of the control system 73 is not energised at the end of the cycle 9, this card will be extracted from the direction changing device 33–1 in the course of the cycle 10 and will pass over the receptacle SP–1 as a result of the non-validation of the flap 29–1. Finally, in the course of the cycle 11, this card which has not been deflected towards the receptacle SP–1 will fall into the merge receptacle CF–1. Before any collating work, the cards constituting each of the primary and secondary card systems, are classified in accordance with a predetermined order, for example in accordance with the order of the increasing classifying marks. Each card bearing a classifying mark is read by a scanning station and its classifying mark is then registered in a classifying mark registering device. FIGURE 6A illustrates four classifying mark registering devices 75, 76, 77 and 78 associated with the scanning stations BP1–1, BS1–1, BP2–1 and BS2–1, respectively. Each classifying mark registering device is composed of a number of registering units, each unit being capable of being electrically connected through a rotary commutating unit, to a column of the card in which one of the digits of the classifying mark to be registered is punched. The number of these registering units, as also the number of rotary commutating units, must be at least equal to the number of digits forming a classifying mark. Each registering unit is of known type. It may be, for example, of the type described as an accessory feature in the aforesaid U.S. Patent No. 2,610,736 and diagrammatically illustrated in FIGURE 6 of the said patent, or in a part of FIGURE 8a of the latter. In FIGURE 5 accompanying the present description, there is illustrated a relay-type registering unit which is based directly upon that illustrated in a part of FIGURE 8a of the aforesaid patent, and wherever possible, each of the members constituting the registering unit of FIGURE 5 is denoted by the same reference as in FIGURE 8a of the aforesaid patent. However, in FIGURE 5, the cam-operated contact CS13 illustrated in the said FIGURE 8a may be replaced by a cam-operated contact C1 which is controlled by a cam (not shown) mounted on the main transmission shaft 34–1 illustrated in FIGURE 2. On the other hand, there has been added to the series of contacts 611a controlled by the relays 611 another series of contacts 611b controlled by these same relays. It will be recalled that the contacts 611a are intended to ensure maintenance of the energisation of the relays 611 which have been energised after the closing of the contact C1. This energisation of the relays 611 and the positioning of the corresponding contacts 611a and 611b are maintained until the contact C1 is opened. It is worthy of note here that, since the cam controlling the contact C1 is mounted on the main transmission shaft 34–1 and thus continuously rotates at a rate of one revolution per cycle, the contact C1 is regularly controlled at each cycle. Moreover, each card acts, at the instant when it passes under a scanning station, on a card lever. Each card lever in turn acts on certain contacts with the object of enabling the classifying mark of the card read by the said scanning station to be registered. One of these contacts CCL has been shown in FIGURE 5.

Each machine cycle has been divided into fifteen intervals of time or "points." Each point corresponds to the passage of a perforation under a scanning station. The points succeed one another in the course of a cycle in the following order: 9, 8, 7, 6, 5, 4, 3, 2, 1, 0, 11, 12, 13, 14, 15. The cam controlling the contact C1 is so adjusted that the contact C1 is maintained closed between the points 9 and 14 in the course of each cycle. Referring to FIGURE 5, it will be seen that the contacts 611b are so mounted as to permit or to prevent, depending upon their positioning, the passage of a pulse sent to the point 13 through a conductor 712 towards a series of conductors 690. The registration of a digit of the classifying mark to be registered takes place between the points 9 and 0 of a cycle, the contact C1 then being closed, as also is the contact CCL. At the point 13 of this same cycle, a pulse is sent through a conductor 712 to the conductors 690, and owing to the fact that only one of the relays, corresponding to the digit which has been registered, is energised, this pulse passes only through the conductor 690 corresponding to the relay which has been energised.

It is desirable to point out here that, since the classifying marks are registered on the cards in accordance with a decimal notation system, each registering unit has been shown, for the sake of explanation, as being provided with nine relays in order to be able to register in one of these nine relays each of the digits constituting a classifying mark. In practice, an appreciable saving of equipment may be effected by providing each registering unit with encoding members of known type, so that four relays per registering unit are sufficient to register a coded combination corresponding to the encoding of one of these digits. The code adopted may be, for example, the well known binary code called the "coded binary decimal."

Referring again to FIGURE 6A, it will be assumed that each of the classifying mark registering devices 75, 76, 77 and 78 consists of as many registering units as there are digits to each classifying mark to be registered. Each of these classifying mark registering devices 75, 76, 77 and 78 is connected through conductors 690 with which it is provided, to each of four memories M75, M76, M77 and M78, respectively. It will be assumed that, for the purposes of the explanation, these memories consist of trigger circuits, but it is to be understood that such memories may be provided by using any other type of bistable storage element, such as relays, magnetic cores or the like. The number of trigger circuits constituting each of the said memories is thus equal to the number of relays provided in the classifying mark registering device connected to the said memory. These trigger circuits which have two inputs and two outputs, are of a sufficiently known type to require no description. However, it will be noted that each trigger comprises two inputs, one called the "normal" input and serving to register a binary digit, and the other called the "complementary" input and serving to register the complement to this digit, and two outputs complementary to one another. The conductors 690 by which the connection is established between each of the classifying mark registering devices 75, 76, 77 and 78 and each of the corresponding memories M75, M76, M77 and M78 are so connected that one of the two ends of each conductor 690 is connected to one of the contacts 611b of the classifying mark registering device, as illustrated in FIGURE 5, and that the other end is connected to the "normal" input of a trigger of the memory corresponding to the said classifying mark registering device. It will be indicated that the "normal" inputs of the triggers constituting the memories M75, M76, M77 and M78 are thus employed for registering the classifying marks, while the "complementary" inputs are employed for returning these memories to zero before any further registration.

It will be appreciated from the explanations given in the foregoing that, when a pulse is simultaneously sent to the classifying mark registering devices 75 and 77 through a conductor 712–P, the classifying marks registered in these registering devices 75 and 77 are transferred into the memories M75 and M77, respectively, and that, when a pulse is simultaneously sent to the classifying mark registering devices 76 and 78 through a conductor 712–S, the classifying marks registered in these registering devices 76 and 78 are transferred into the memories M76 and M78, respectively. The return-to-zero of the memories M75 and M77 is effected by means of a pulse sent to these memories through a conductor F231, while that of the memories M76 and M78 is effected by means of a pulse sent to the said memories through a conductor F234. The classifying marks contained in the memories M75, M76, M77 and M78 may be transferred to memories MBP, MBS, MGP and MGS associated with the memories M75, M76, M77 and M78 respectively through control members K1, K2, K3 and K4. These control members are, for example, of the type illustrated in FIGURE 12, and the construction of these members will not be further discussed since they have already been described. On the other hand, it is to be noted that the memories MBP, MBS, MGP and MGS consist of trigger circuits similar to those constituting the memories M75, M76, M77 and M78, but that these trigger circuits receive binary digits (and their complements) which they must store, by means of their two inputs, whereby any return-to-zero of the memories MBP, MBS, MGP and MGS before further registration is avoided. The transfer of the classifying marks contained in the memories M75 and M77 to the respective memories MBP and MGP is initiated by means of a pulse sent to the control members K1 and K3 through a conductor F230. Likewise, the transfer of the classifying marks contained in the memories M76 and M77 to the respective memories MBS and MGS is initiated by means of a pulse sent to the members K2 and K4 through a conductor F233. The classifying mark contained in the memory MGP may be transferred to a memory MPE similar to the memory MGP through a control member K5. The transfer of a classifying mark contained in the memory MGP to the memory MPE is initiated by means of a pulse sent to the control member K5 through a conductor F229.

The chronological order in which all these transfers are effected is indicated in FIGURE 7, which shows in addition the maximum duration of the main operations which can be performed in the course of two successive cycles.

FIGURES 6A and 6B assembled in the manner indicated in FIGURE 6 show that the comparison of the classifying marks contained in the memories MBP and MGP is effected by a comparator CP, while the comparison of the classifying marks contained in the memories MBS and MGS is effected by a comparator CS. A comparator CPS1 permits of comparing the classifying marks contained in the memories MGP and MGS, while a comparator CPS2 permits of comparing the classifying marks contained in the memories MPE and MGS.

Before the description is continued, it is to be noted that the despatch of the pulses to the classifying mark registering devices and the memories through the conductors 712–P, 712–S, F229, F230, F231, F233 and F234 is so performed that the registration of the classifying marks in the various memories is complete at the end of the cycle. It will be assumed that, at the point 14 of a cycle, the classifying mark of the last card which has passed under the scanning station BP1–1 is contained in the memory M75, that of the last card which has passed under the scanning station BP2–1 is contained in the memories M77 and MBP, that of the last card which has arrived in the storage position 33–1 is contained in the memory MGP, and that of the last card which has been ejected towards one of the receptacles CP–1 and CF–1 is contained in the memory MPE. Similarly, the classifying mark on the last card which has passed under the scanning station BS1–1 is contained in the memory M76, that of the last card which has passed under the scanning station BS2–1 is contained in the memories M78 and MBS, and finally that on the last card which has been introduced into the storage position 32–1 is contained in the memory MGS.

It will be appreciated from all these considerations that the comparator CP makes it possible to compare, at the point 14 of a cycle, the classifying marks on the last card which has passed under the scanning station BP2–1 and on the last card which has arrived in the storage position 33–1. Likewise, the comparator CS makes it possible to compare at the point 14 the classifying marks on the last card which has passed under the scanning station BS2–1 and on the last card which has arrived in the storage position 32–1. The comparator CPS1 makes it possible to compare at the point 14 the classifying marks on the last two cards which have arrived in the storage position 32–1 and in the storage position 33–1 respectively. Finally, the comparator GSP2 makes it possible to compare at the point 14 the classifying marks on the last card which has arrived in the storage position 32–1 and on the last card which has been ejected towards one of the receptacles SP–1 and CF–1. FIGURE 6B shows that each of the comparators CP and CS comprises two outputs marked $\neq$ and $=$. In each of the said comparators, one of these two outputs is brought to a positive potential in accordance with whether the classifying marks compared are different or identical. Thus, for example, if the classifying marks compared by the comparator CP are identical, only the output marked $=$ of this comparator is brought to a positive potential. FIGURE 6B again shows that the comparator CSP1 comprises three outputs marked $<,=,>$. The output $<$ of this comparator is brought to a positive potential if the classifying mark on the last primary card which has arrived in the storage position 33–1 is lower than the classifying mark on the last secondary card which has arrived in the storage position 32–1, or, what amounts to the same thing, if the said primary card is intended to be sent to the receiving receptacles before the said secondary card. If, on the other hand, the classifying mark on the primary card is higher than that of the secondary card to be compared, only the output marked $>$ is brought to a positive potential. Finally, if the two classifying marks on these cards are equal, only the output $=$ of the comparator CPS1 is brought to a positive potential. It will now be noted from FIGURE 6B that the comparator CSP2 comprises an output marked $<$ which is brought to a positive potential only in the case where the classifying mark on the last primary card which has been ejected towards one of the receptacles SP–1 and CF–1 is lower than the classifying mark on the last secondary card which has arrived in the storage position 32–1. There are shown in FIGURE 6B two memory state indicating members IMGP and IMGS of known type, which are associated with the memories MGP and MGS respectively and which have the object of indicating the presence or absence of classifying marks in the memories which are associated with them. Each of the said memory state indicators comprises an output which is brought to a positive potential each time the memory associated with each of these indicators contains no classifying mark.

FIGURE 6B further shows a set of AND circuits, OR circuits, inverters and control circuits which are so connected as to render possible the application of the invention. It will be recalled that these elemental circuits are known and, if it is considered necessary, reference may be had to the explanations which have previously been given in the description with reference to these circuits.

A first AND circuit 200 having two inputs is connected by one of its inputs to the output $\neq$ of the comparator CP, and, by the other input, to the output $>$ of the comparator CPS1. A second AND circuit 201 having two inputs is connected by one of its inputs to the output $\neq$ of the comparator CP and by the other input to the output $<$ of the comparator CPS1. A third AND circuit 202 having two inputs is connected by one of its inputs to the output $=$ of the comparator CP and by the other input to the output $<$ of the comparator CPS1. A fourth AND circuit 203 having two inputs is connected by one of its inputs to the output of the memory state indicator IMGP and by the other input to the output of the memory state indicator IMGS. A fifth AND circuit 204 having two inputs is connected by one of its inputs to the output $=$ of the comparator CP and by the other input to the output $=$ of the comparator CPS1. A sixth AND circuit 205 having two inputs is connected by one of its inputs to the output $>$ of the comparator CPS1 and by the other input to the output $<$ of the comparator CBS2. FIGURE 6B further shows three OR circuits 206, 207 and 208 having two inputs, which are each connected by one of their inputs to the output of the memory state indicator IMGS. The other input of the OR circuit 206 is connected to the output $<$ of the comparator CPS–1. The other input of the OR circuit 207 is connected through an inverter 209 to the output $>$ of the comparator CPS1. The other input of the OR circuit 208 is connected through an inverter 210 to the output of the AND circuit 200. A fourth OR circuit 211 having two inputs is connected by one of its inputs to the output of the comparator CPS and by the other input to the output $<$ of the AND circuit 204. A fifth OR circuit 212 having two inputs is connected by one of its inputs to the output of the memory state indicator IMGP, while its other input is connected through an inverter 213 to the output of the OR circuit 211. A sixth OR circuit 214 having three inputs is connected by each of its inputs to each of the outputs of the AND circuits 201, 202 and 204 respectively. A seventh AND circuit 215 having two inputs is connected by one of its inputs to the output of the OR circuit 214, and by the other input to the output $\neq$ of the comparator CS. It is further to be noted that there is an eighth AND circuit 216 having two inputs, one of the inputs of which is connected through an inverter 217 to the output of the OR circuit 212, while its other input is connected through an inverter 218 to the output of the AND circuit 215. In addition, FIGURE 6B shows a pulse counter KTI, the function of which is to check the despatch of pulses intended to energise the electromagnet of the clutch member 36–1 in order to prevent an excessively large number of cards from accumulating in the storage position 32–1 and exceeding the provided capacity. A large number of cards ejected all together from a storage position might not be correctly driven by the rollers, and as a result of a dispersion of the cards due to the excessive thickness of a block, it might produce errors in the orientation of the cards or damage to the said cards. Although only one pulse counter has been provided in the control device of the collator illustrated in FIGURES 6A and 6B, it is obvious that in practice any collator may be provided with as many pulse counters as are necessary to avoid the aforesaid disadvantages.

Referring again to FIGURE 6B, it will be noted that the pulse counter KTI which, for the requirements of the explanation, consists of a pulse counter of the step-by-step switch type, comprises an input A through which the pulses to be counted arrive, an input C for the return-to-zero of the counter by means of a pulse arriving through this input, an output B which is brought to a positive potential as soon as the number of pulses counted becomes equal to the maximum number of cards than can be accumulated in the storage position 32–1. The output B of the pulse counter KTI is connected on the one hand to the so-called control input of a control circuit 220 and on the other hand through an inverter 219 to the control input of a control circuit 221.

The output of the AND circuit 216 is connected to the control input of a control circuit 222. The output of the AND circuit 205 is connected to the control input of a control circuit 223. The output of the OR circuit 212 is connected to the control input of a control circuit 224, while that of the AND circuit 215 is connected through an inverter 218 to the control input of a control circuit 225. FIGURE 6B illustrates three control circuits 226, 227 and 228 which are connected by their control input to the outputs of the OR circuits 206, 207 and 208 respectively. There will further be seen three trigger circuits B1, B2 and B3 which are connected, as shown in FIGURE 6B, by their so-called normal output to the control input of a control circuit 229, to each of the control inputs of three control circuits 230, 231 and 232, and to each of the control inputs of three control circuits 233, 234 and 235, respectively. The trigger circuit B1 is connected through its so-called normal input to the output of the control circuit 227 and by its so-called complementary input to the output of the control circuit 229. Similarly, the trigger circuit B2 is connected by its normal input to the output of the control circuit 228 and by its complementary input to the output of the control circuit 232. Finally, the complementary input of the trigger circuit B3 is connected to the output of the control circuit 235, while its normal input is connected to the output of a logical mixer circuit 240. The logical mixer circuit 240 comprises two inputs which are connected, one to the output of the control circuit 220 and the other to the output of the control circuit 221. The output of the control circuit 224 is in addition connected to the input C of the pulse counter KTI. The output of the control circuit 222 is connected to the input A of the said pulse counter.

Depending upon the state of its control input, each control circuit blocks or allows the passage of the pulses arriving at it. These pulses are supplied at each cycle, at predetermined instants, by means of a pulse generator-distributor CD of known type. The said pulse generator-distributor is driven, in the same way as the main transmission shaft 34–1, at constant speed by the motor M and rotates at a rate of one revolution per machine cycle. In the course of each cycle, the said pulse generator-distributor supplies a pulse at each point 4, 2, 11, 13, 14 and 15 of a cycle and these pulses are sent to the control circuits through the output studs of the pulse generator-distributor. Each of these studs is shown in FIGURE 6B and represented by a digit which corresponds to the point of the cycle at which a pulse is sent through this stud. The contacts IT, controlled in common by the armature of an electromagnet RM permit, when closed, the despatch to the control circuits of the pulses appearing at the studs 15, 4, 2, 11 and 13 of the pulse generator-distributor. The energisation of the electromagnet RM is obtained by means of a pulse supplied by the stud 14 of the pulse generator-distributor after depression of a starting push button MM, and this energisation is maintained by closing of a contact IM controlled, simultaneously with the contacts IT, by the armature of the electromagnet RM. De-energisation of the electromagnet RM is effected by energising an electromagnet RA whose armature, when attracted, opens the holding circuit of the electromagnet RM. Energisation of the electromagnet RA is obtained by means of a pulse supplied by the stud 13 of the pulse generator-distributor and successively transmitted through a control circuit 236 and an amplifying circuit 237 of known type. The control input of the control circuit 236 is connected to the output of the AND circuit 203.

Referring again to FIGURES 6A and 6B, it will be noted that each of the conductors connected to the output of the control circuits 223, 224, 226, 227, 228, 229, 230, 231, 233 and 234 and to the output of the logical mixer circuit 240 is denoted by the letter F followed by the reference of the circuit to which this conductor is connected. Each of the conductors F223, F224, F226, F227, F228, F229, F230, F231, F234 and F240 leads, respectively, to the control system 72 of the flap 28–1, to the control mechanism 70 of the pusher member of the storage position 32–1, to the control system 73 of the flap 29–1, to the control mechanism 71 of the pusher member of the storage position 33–1, to the clutch member 35–1, to the control member K5, to the control members K1 and K3, to the memories M75 and M77, to the control members K2 and K4, to the memories M76 and M78 and finally to the clutch member 36–1. It will further be noted that the conductors 712–P and 712–S are connected to the outputs of the control circuits 232 and 235, respectively. FIGURE 6B shows that the output of the control circuit 224 is also connected to the so-called pulse input of the control circuit 220 and that the output of the control circuit 225 is connected to the pulse input of the control circuit 221. Finally, FIGURE 6B shows that the pulse generator-distributor CD is connected through its stud 15 to the pulse inputs of the control circuits 222, 223, 224, 225, 226, 227 and 228, through its stud 4 to the pulse input of the control circuit 229, through its stud 2 to the pulse inputs of the control circuits 230 and 233, through its stud 11 to the pulse inputs of the control circuits 231 and 234, and through its stud 13 to the pulse inputs of the control circuits 232 and 235.

The logical arrangement of the machine just described with reference to FIGURE 6B may be summarised by referring to the descriptive block diagram of FIGURE 6B1, which shows the comparators CP, CPS1, CPS2, CS and the memory state indicators IMGP and IMGS. As is shown by FIGURE 6B1, this logical arrangement consists of a "primary feed path select flap control" unit 1001, a "primary feed path pusher member control" unit 1002 for controlling the block ejection of the cards accumulated in the storage position 33–1, a "primary feed path clutch control" unit 1003 for controlling the feed advance of the primary cards, a unit 1004 for the control of the transfers from the memory MGP to the memory MPE, a "primary feed path classifying mark transfor control" unit 1005, a "secondary feed path select flap control" unit 1006, a "secondary feed path pusher member control" unit 1007 for controlling the block ejection of the cards accumulated in the storage position 32–1, a "secondary feed path clutch control" unit 1008 for controlling the feed advance of the secondary cards and a "secondary feed path classifying mark transfer control" unit 1009. In addition, the pulse generator-distributor CD is symbolically represented with its studs 15, 4, 2, 11, 13 and the pulse counter KTI with its two inputs A, B and its output C. In a simplified constructional form, it may be assumed that the pulses to be counted are suppled to the counter KTI by a card lever device 1010 which controls the arrival of the cards in the storage position 32–1 and sends a pulse to the counter KTI each time a secondary card enters the said storage position.

In a more simplified form, the counter KTI may be omitted. In this case, the control input of the circuit 220 is simply connected to a positive voltage source (not shown) through a contact which is closed by the card lever 1010 when the number of cards introduced into the storage position 32–1 is equal to a predetermined maximum number.

The construction of the various control units of FIGURE 6B1 will now be described, but it is to be noted that the internal arrangement of each of these units may, in accordance with the circuits employed, differ from that which is now to be described by way of example with reference to FIGURES 6B and 6B1. It is to be understood that FIGURE 6B1 may be joined to FIGURE 6A similarly to FIGURE 6B.

The "primary feed path select flap control" unit 1001 consists of the OR circuit 206 and the control circuit 226, which are connected in the manner indicated in FIGURE 6B. Accordingly, the said unit 1001 is connected to the output < of the comparator CPS1 and to the output of the indicator IMGS.

The "primary feed path pusher member control" unit 1002 consists of the OR circuit 207, the inverter 209 and the control circuit 227, which are connected as indicated in FIGURE 6B. This unit 1002 is therefore connected to the output > of the comparator CPS1 and to the output of the indicator IMGS.

The "primary feed path clutch control" unit 1003 consists of the AND circuit 200, the inverter 210, the OR circuit 208 and the control circuit 228, which are connected as indicated in FIGURE 6B. This unit 1003 is therefore connected to the output $\neq$ of the comparator CP, to the output > of the comparator CPS1 and to the output of the indicator IMGS.

The unit 1004 consists of the trigger circuit B1 and the control circuit 229. This unit is therefore controlled by the unit 1002.

The unit 1005 consists of the trigger circuit B2 and the control circuits 230, 231 and 232. This unit is thus controlled by the unit 1003.

The unit 1006 consists of the AND circuit 205 and the control circuit 223, which are connected as indicated in FIGURE 6B. Accordingly, this unit is connected to the output > of the comparator CPS1 and to the output < of the comparator CPS2.

The unit 1007 consists of the AND circuit 204, the OR circuits 211 and 212, the inverter 213 and the control circuit 224 connected as indicated in FIGURE 6B. This unit is therefore connected to the output = of the comparator CP, to the output = of the comparator CPS1, to the output < of the comparator CPS1 and to the output of the indicator IMGP.

The unit 1008 consists of the AND circuits 201, 202 and 204, the OR circuit 214, the AND circuit 215, the inverters 218 and 219, the control circuits 220, 221 and 225 and the logical mixer circuit 240, which are connected as indicated in FIGURE 6B. This unit 1004 is therefore connected to the outputs = and ≠ of the comparator CP, to the outputs < and = of the comparator CPS1, to the output of the indicator IMGP and to the output ≠ of the comparator CS. In addition, this unit is controlled by the pulse counter KTI.

The unit 1009 consists of the trigger circuit B3 and the control circuits 233, 234 and 235. This unit is thus controlled by the unit 1008.

The pulses supplied by the stud 15 of the pulse generator-distributor CD are simultaneously sent to the units 1001, 1002, 1003, 1006, 1007 and 1008, which block them or allow them to pass, depending upon the state of the comparators and of the memory state indicators. When these pulses are transmitted by the unit 1001, they are sent to the control system 73. When they are transmitted by the unit 1002, they are sent to the control mechanism 71 and to the unit 1004. When they are transmitted by the unit 1003, they are sent to the clutch member 35–1 and to the unit 1005. When they are transmitted by the unit 1006, they are sent to the control system 72. When they are transmitted by the unit 1007, they are sent to the control mechanism 70, to the counter KTI and to the unit 1008. When they are transmitted by the unit 1008, they are sent to the clutch member 36–1. It is to be noted that the unit 1008 may transmit to the member 36–1 the pulse sent by the unit 1007, and that this transmission takes place under the control of the counter KTI.

The pulses supplied by the stud 4 are sent to the control member K5 through the unit 1004.

The pulses supplied by the stud 2 are sent to the control members K1 and K2 through the unit 1005, and to the control members K3 and K4 through the unit 1009.

The pulses supplied by the stud 11 are sent to the memories M75 and M77 through the unit 1005 and to the memories M76 and M78 through the unit 1009.

Finally, the pulses supplied by the stud 13 are sent to the classifying mark registering devices 75, 77, 76, 78 through the units 1005 and 1009.

*Operation of the collator in the case of a chosen example of collation*

The operation of the collator just described, in its application to an example of collation, will now be explained, the said example having been particularly chosen to show the advantages afforded by said collator and to illustrate all the cases which may arise in practice. The example chosen relates to an operation of collating a primary card index system and a secondary card index system, the primary card index system consisting, as indicated in the following Table I, of cards P1, P2, P3, etc., the secondary card index system consisting of the cards S1, S2, S3, etc., and each card in each card system being followed by a number representing its classifying mark.

TABLE I

| Primary Card Index System | Secondary Card Index System |
| --- | --- |
| P1 (3501) | S1 (3503) |
| P2 (3502) | S2 (3503) |
| P3 (3503) | S3 (3503) |
| P4 (3503) | S4 (3505) |
| P5 (3504) | S5 (3505) |
| P6 (3505) | S6 (3505) |
| P7 (3506) | S7 (3505) |
| P8 (3506) | S8 (3505) |
| P9 (3506) | S9 (3513) |
| P10 (3507) | S10 (3513) |
| P11 (3509) | S11 (3513) |
| P12 (3510) | S12 (3513) |
| P13 (3511) | S13 (3513) |
| P14 (3512) | S14 (3513) |
| P15 (3513) | S15 (3514) |
| P16 (3515) | S16 (3514) |
| P17 (3516) | S17 (3516) |
| P18 (3516) | |
| P19 (3517) | |

As shown by Table I, the cards have been classified in the order of increasing classifying marks in each of the card index systems before any collating work. In addition, it will be assumed that the pulse counter KTI has been set to the value 4, so that its output B is brought to a positive potential when it has received four pulses through its input A. The primary card index system and the secondary card index system are then placed in the hoppers MP–1 and MS–1 respectively, whereafter the machine is started by maintaining the push button MM in the depressed position. The pulse generator-distributor sends a pulse through its stud 14 which energises the electromagnet RM, since the push button closes the energising circuit of this electromagnet. The contacts IT and IM close. Since the electromagnet RA is not energised, the holding circuit of the electromagnet RM, which is closed by the contact IM, continues to energise the electromagnet RM. The memories M75, M76, M77 and M78 contain no classifying mark other than zero, and the same is the case with the memories MBP, MGP, MPE, MGS and MBS. Consequently, the output = of the comparator CP is brought to a positive potential, as also are the output = of the comparator CPS1 and the output = of the comparator CS. Likewise, the outputs of the memory state indicators IMGP and IMGS are brought to a positive potential. Owing to the state of the comparators CP, CPS1, CPS2 and CS and of the indicators IMGP and IMGS, the outputs of the OR circuits 206, 207 and 208 and of the AND circuits 203 and 204 are brought to a positive potential. Consequently, the control circuits 226, 227 and 228 are rendered conductive. Of the AND circuits 201, 202 and 204, only the AND circuit 204 has its output brought to a positive potential, and consequently the output of the OR circuit 214 is at a positive potential, that of the OR circuit 211 is also at a positive potential, but that of the inverting circuit 213 is not. Since the output of the indicator IMGP is at a positive potential, the output of the OR circuit 212 is at a positive potential, whereby the control circuit 224 is rendered conductive. Consequently, that of the inverter 217 is not. That of the AND circuit 215 is also not rendered conductive, since the output ≠ of the comparator CS is not brought to a positive potential. It follows that the ouput of the inverter 218 is brought to a positive potential and that, since the inverter 217 is not brought to a positive potential, the output of the AND circuit 216 is also not brought to a positive potential. Therefore, the control circuit 222, which is connected to the output of the AND circuit 216, is rendered non-conductive.

The output B of the pulse counter KTI is not brought to a positive potential. Consequently, the output of the inverter 219 is brought to a positive potential, whereby the control circuit 221 is rendered conductive.

Since the output of the inverter 218 is brought to a positive potential, the control circuit 225 is rendered conductive.

Since the output > of the comparator CPS1 and the output < of the comparator CPS2 are not brought to a positive potential, the output of the AND circuit 205 is not at a positive potential, whereby the control circuit 223 is rendered non-conductive.

The control circuit 220 is non-conductive because the output B of the pulse counter KTI is not brought to a positive potential.

To sum up, before the beginning of the cycle 1, the only control circuits which are rendered conductive are the circuits 226, 227, 228, 224, 225, 221 and 236. Since the contacts IT are closed, a pulse sent by the stud 15 of the pulse generator-distributor CD to the control circuits 226, 227, 228, 222, 223, 224 and 225 is therefore transmitted only by the control circuits 226, 227, 228, 224 and 225. On being transmitted by the circuit 226, the said pulse produces the operation of the flap 29–1. On being transmitted by the circuit 227, the said pulse on the one hand enables the pusher member of the storage device 33–1 to come into operation, and on the other hand positions the trigger circuit B1 at "1," whereby the control circuit 229 is rendered conductive. On being transmitted by the circuit 228, the said pulse on the one hand renders possible the engagement of the primary feed path and on the other hand positions the trigger circuit B2 at "1," whereby the control circuits 230, 231 and 232 are rendered conductive. On being transmitted by the circuit 224, the said pulse enables the pusher member of the storage position 32–1 to become operative. In addition, the pulse transmitted by the circuit 224 is sent to the input C of the pulse counter KTI, which remains at zero, and to the control circuit 220, which blocks it. The pulse transmitted by the circuit 225 is sent to the control circuit 221 which, since it is rendered conductive, transmits it through the logical mixer circuit 240 on the one hand to the trigger circuit B3, which is then positioned at "1," and on the other hand to the clutch member 36–1 of the secondary feed path. Since the trigger circuit B3 is positioned at "1," the control circuits 233, 234 and 235 are rendered conductive.

At the point 4 of the cycle 1, a pulse sent by the stud 4 of the pulse generator-distributor CD is transmitted through the circuit 229, which on the one hand returns the trigger circuit B1 to zero and on the other hand brings about the transfer of the contents of the memory MGP to the memory MPE, which, obviously, remains at zero, because the memory MGP contained no classifying mark.

At the point 2 of the cycle 1, a pulse sent by the stud 2 is transmitted through the circuits 230 and 233. This pulse brings about the transfer of the contents of the memories M75, M77, M78 and M76 to the memories MBP, MGP, MGS and MBS, which also remain at zero.

At the point 11 of the cycle 1, a pulse sent by the stud 11 is transmitted through the circuits 231 and 234. This pulse brings about the return-to-zero of the memories M 75, M77, M78 and M76.

At the point 13 of the cycle 1, a pulse sent by the stud 13 is transmitted through the circuits 232, 235 and 236. It is important to note that in the course of the cycle 1, since the two feed paths are engaged, the primary card P1 and the secondary card S1 are extracted from the hoppers MP-1 and MS-1 and that these two cards may be read by the scanning stations BP1-1 and BS1-1 respectively, only in the course of the cycle 2. The pulse transmitted through the circuit 232 effects, on the one hand, the return-to-zero of the trigger circuit B2 and on the other hand the transfer of the classifying marks registered in the registering devices 75 and 77 to the memories M75 and M77, which remain at zero because no classifying mark was registered in the course of the cycle 1. Similarly, the pulse transmitted by the circuit 235 brings about on the one hand the return-to-zero of the trigger circuit B3 and on the other hand the transfer of the classifying marks registered in the registering devices 76 and 78 to the memories M76 and M78, which remain at zero for similar reasons. Finally, the pulse transmitted by the circuit 236 energizes the electromagnet RA, which brings about the de-energisation of the electromagnet RM, because the holding circuit of the latter is then broken. However, the energisation of the electromagnet RM is maintained by continuing to hold the push button MM in the depressed position. It is essential to indicate here that, in order to avoid stoppage of the machine, it is necessary to keep the said push button depressed for the first three cycles in order to enable either one of the memories MGP and MGS to be occupied, and thus to enable the circuit 236 to be rendered non-conductive.

At the point 14 of the cycle 1, a pulse sent by the stud 14 energises the electromagnet RM and this energisation is again maintained because the holding circuit of the said electromagnet has ceased to be broken.

In order to abbreviate the present description as far as possible, the explanations which will be given in the following text will not be so detailed as those given in the foregoing. However, in order that the development of the operations which follow may be understood, the state of the circuits and the main operations arising therefrom in the course of each cycle will be indicated with reference to a Table II included in the present description, which table shows on the one hand the state of the contents of the memories after the performance of the transfers performed at the characteristic points 4, 2 and 13 of each cycle, and on the other hand the control circuits which are rendered conductive as a result of these transfers, as a function of the contents of the memories, and the members controlled at the point 15 of each cycle by the operation of each of these control circuits.

TABLE II

| Cycle | Point 4 | Point 2 | | | | Point 13 | | | | Control Circuits Rendered Conductive | | | | | | | | | | Members Controlled At The Point 15 | | | KTI |
|---|---|---|---|---|---|---|---|---|---|---|---|---|---|---|---|---|---|---|---|---|---|---|---|
| | MPE | MBP | MGP | MGS | MBS | M75 | M77 | M76 | M78 | 226 | 227 | 228 | 222 | 223 | 224 | 225 | 221 | 220 | 236 | CLA | PRO | EMB | |
| 1 | — | — | — | — | — | — | — | — | — | + | + | + | | | + | + | + | | + | 29.1 | 33.1 32.1 | P and S | 0 |
| 2 | — | — | — | — | — | 3501 (P1) | — | 3503 (S1) | — | + | + | + | | | + | + | + | | + | 29.1 | 33.1 32.1 | P and S | 0 |
| 3 | — | 3501 (P1) | — | — | 3503 (S1) | 3502 (P2) | 3501 (P1) | 3503 (S2) | 3503 (S1) | + | + | + | | | + | + | + | | + | 29.1 | 33.1 32.1 | P and S | 0 |

TABLE II—Continued

| Cycle | Point 4 MPE | Point 2 MBP | MGP | MGS | MBS | Point 13 M75 | M77 | M76 | M78 | Control Circuits Rendered Conductive 226 | 227 | 228 | 222 | 223 | 224 | 225 | 221 | 220 | 236 | Members Controlled At The Point 15 CLA | PRO | EMB | KTI |
|---|---|---|---|---|---|---|---|---|---|---|---|---|---|---|---|---|---|---|---|---|---|---|---|
| 4 | — | 3502 (P2) | 3501 (P1) | 3503 (S1) | 3503 (S2) | 3503 (P3) | 3502 (P2) | 3503 (S3) | 3503 (S2) | + | + | + | + | | | + | + | | | 29.1 | 33.1 | P and S | 1 |
| 5 | 3501 (P1) | 3503 (P3) | 3502 (P2) | 3503 (S2) | 3503 (S3) | 3503 (P4) | 3503 (P3) | 3505 (S4) | 3503 (S3) | + | + | + | + | | | + | + | | | 29.1 | 33.1 | P and S | 2 |
| 6 | 3502 (P2) | 3503 (P4) | 3503 (P3) | 3503 (S3) | 3505 (S4) | 3504 (P5) | 3503 (P4) | 3505 (S5) | 3505 (S4) | | + | + | | | | | + | | | — | 33.1 | P | 2 |
| 7 | 3503 (P3) | 3504 (P5) | 3503 (P4) | 3503 (S3) | 3505 (S4) | 3505 (P6) | 3504 (P5) | 3505 (S5) | 3505 (S4) | | + | + | | | + | + | + | | | — | 33.1 32.1 | P and S | 0 |
| 8 | 3503 (P4) | 3505 (P6) | 3504 (P5) | 3505 (S4) | 3505 (S5) | 3506 (P7) | 3505 (P6) | 3505 (S6) | 3505 (S5) | + | + | + | + | | | + | + | | | 29.1 | 33.1 | P and S | 1 |
| 9 | 3504 (P5) | 3506 (P7) | 3505 (P6) | 3505 (S5) | 3505 (S6) | 3506 (P8) | 3506 (P7) | 3505 (S7) | 3505 (S6) | | + | + | | | + | + | + | | | — | 33.1 32.1 | P and S | 0 |
| 10 | 3505 (P6) | 3506 (P8) | 3506 (P7) | 3505 (S6) | 3505 (S7) | 3506 (P9) | 3506 (P8) | 3505 (S8) | 3505 (S7) | | | + | | | + | + | + | | | — | 32.1 | P and S | 0 |
| 11 | 3505 (P6) | 3506 (P9) | 3506 (P8) | 3505 (S7) | 3505 (S8) | 3507 (P10) | 3506 (P9) | 3513 (S9) | 3505 (S8) | | | + | | | + | + | + | | | — | 32.1 | P and S | 0 |
| 12 | 3505 (P6) | 3507 (P10) | 3506 (P9) | 3505 (S8) | 3513 (S9) | 3509 (P11) | 3507 (P10) | 3513 (S10) | 3513 (S9) | | | | | | + | + | + | | | — | 32.1 | S | 0 |
| 13 | 3505 (P6) | 3507 (P10) | 3506 (P9) | 3513 (S9) | 3513 (S10) | 3509 (P11) | 3507 (P10) | 3513 (S11) | 3513 (S10) | + | + | + | + | | | + | + | | | 29.1 | 33.1 | P and S | 1 |
| 14 | 3506 (P9) | 3509 (P11) | 3507 (P10) | 3513 (S10) | 3513 (S11) | 3510 (P12) | 3509 (P11) | 3513 (S12) | 3513 (S11) | + | + | + | + | | | + | + | | | 29.1 | 33.1 | P and S | 2 |
| 15 | 3507 (P10) | 3510 (P12) | 3509 (P11) | 3513 (S11) | 3513 (S12) | 3511 (P13) | 3510 (P12) | 3513 (S13) | 3513 (S12) | + | + | + | + | | | + | + | | | 29.1 | 33.1 | P and S | 3 |
| 16 | 3509 (P11) | 3511 (P13) | 3510 (P12) | 3513 (S12) | 3513 (S13) | 3512 (P14) | 3511 (P13) | 3513 (S14) | 3513 (S13) | + | + | + | + | | | + | + | | | 29.1 | 33.1 | P and S | 4 |
| 17 | 3510 (P12) | 3512 (P14) | 3511 (P13) | 3513 (S13) | 3513 (S14) | 3513 (P15) | 3512 (P14) | 3514 (S15) | 3513 (S14) | + | + | + | + | | | + | | + | | 29.1 | 33.1 | P | 4 |
| 18 | 3511 (P13) | 3513 (P15) | 3512 (P14) | 3513 (S13) | 3513 (S14) | 3515 (P16) | 3513 (P15) | 3514 (S15) | 3513 (S14) | + | + | + | + | | | + | | + | | 29.1 | 33.1 | P | 4 |
| 19 | 3512 (P14) | 3515 (P16) | 3513 (P15) | 3513 (S13) | 3513 (S14) | 3516 (P17) | 3515 (P16) | 3514 (S15) | 3513 (S14) | | + | + | | | + | + | | + | | — | 33.1 32.1 | P and S | 0 |
| 20 | 3513 (P15) | 3516 (P17) | 3515 (P16) | 3513 (S14) | 3513 (S15) | 3516 (P18) | 3516 (P17) | 3514 (S16) | 3514 (S15) | | | | | | + | + | + | | | — | 32.1 | S | 0 |
| 21 | 3513 (P15) | 3516 (P17) | 3515 (P16) | 3514 (S15) | 3514 (S16) | 3516 (P18) | 3516 (P17) | 3516 (S17) | 3514 (S16) | | | | | + | + | + | + | | | 28.1 | 32.1 | S | 0 |
| 22 | 3513 (P15) | 3516 (P17) | 3515 (P16) | 3514 (S16) | 3516 (S17) | 3516 (P18) | 3516 (P17) | — | 3516 (S17) | | | | | + | + | + | + | | | 28.1 | 32.1 | S | 0 |
| 23 | 3513 (P15) | 3516 (P17) | 3515 (P16) | 3516 (S17) | — | 3516 (P18) | 3516 (P17) | — | — | + | + | + | | | | | | | | 29.1 | 33.1 | P | 0 |
| 24 | 3515 (P16) | 3516 (P18) | 3516 (P17) | 3516 (S17) | — | 3517 (P19) | 3516 (P18) | — | — | | + | + | | | | | | | | — | 33.1 | P | 0 |
| 25 | 3516 (P17) | 3517 (P19) | 3516 (P18) | 3516 (S17) | — | — | 3517 (P19) | — | — | | + | + | | | + | + | + | | | — | 33.1 32.1 | P and S | 0 |
| 26 | 3516 (P18) | — | 3517 (P19) | — | — | — | — | — | — | + | + | + | | | + | + | + | | | 29.1 | 33.1 32.1 | P and S | 0 |
| 27 | 3517 (P19) | — | — | — | — | — | — | — | — | + | + | + | | | + | + | + | | + | 29.1 | 33.1 32.1 | P and S | 0 |

LEGEND:
 CLA=Flap
 PRO=Pusher Member
 EMB=Clutch
 KTI=Pulse Counter

In the accompanying Table II, there have been indicated by the sign + the control circuits which are rendered conductive. The determination of the conditions enabling these circuits to be rendered conductive or nonconductive in accordance with the contents of the memories MBP, MGP, MPE, MGS and MBS can readily be established by referring to the AND, OR and inverter circuits of FIGURE 6B, in a manner similar to that already indicated.

The main operations which have already been performed in cycle 1 are summarised in Table II. The said table shows that at the point 4 of the cycle 1, after the transfer of the contents of the memory MGP to the memory MPE, the memory MPE contains no classifying mark. Likewise, after the transfers effected at the point 2 of the cycle 1, the memories MBP, MGP, MGS and MBS contain no classifying mark. Table II also shows that after the transfers performed at the point 13 the memories M75, M77, M76 and M78 contain no classifying mark. As a result of the state of the memories MBP, MGP, MPE, MGS and MBS, the control circuits which are rendered conductive are, as set out in Table II, the circuits 226, 227, 228, 224, 225, 221 and 236. Table II also shows that the members which are controlled from the point 15 of the cycle 1 by the operation of the control circuits which have been rendered conductive are the flap 29-1, the pusher members of the storage positions 33-1 and 32-1, and the clutch members of the primary feed path (P) and of the secondary feed path (S). The pulse counter KTI, having received no pulse, remains at zero.

Since the two feed paths are engaged, the card P1 will, in the course of the cycle 2, pass under the scanning station BP1-1, while the card S1 will, in the course of the same cycle, pass under the scanning station BS1-1. Simultaneously, the cards P2 and S2 will be extracted from the hoppers MP-1 and MS-1 respectively in the course of this cycle.

If desired, the operations which will be initiated in the course of cycle 2 may be determined by reference to the circuits of FIGURES 6A and 6B. It will then be observed that, as is shown by Table II in summarised form, after the transfer performed at the point 4 of the cycle 2 the memory MPE contains no classifying mark, and after the transfers performed at the point 2 of this same cycle the memories MBP, MGP, MGS and MBS contain no classifying mark. It will likewise be observed that after the transfers performed at the point 13 of the cycle 2 the classifying mark 3501 on the card P1 is contained in the memory M75, the classifying mark 3503 on the card S1 is contained in the memory M76, and the memories M77 and M78 contain no classifying mark. It follows that the control circuits which are rendered conductive are the circuits 226, 227, 228, 224, 225, 221 and 236. Consequently, the members which will be controlled from the point 15 of the cycle 2 are the flap 29-1, the pusher members of the storage positions 33-1 and 32-1 and the clutch members of the primary feed path and of the secondary feed path. The pulse counter KTI remains at zero.

Since the two feed paths are still engaged, the card P1 will pass, in the course of the cycle 3, under the scanning station BP2-1, while the card P2 will pass under the scanning station BP1-1 and the card P3 will be extracted from the hopper MP-1. At the same time, the card S1 will pass, in the course of the cycle 3, under the scanning station BS2-1, while the card S2 will pass under the scanning station BS-1 and the card S3 will be extracted from the hopper MS-1.

After the transfer performed at the point 4 of the cycle 3, the memory MPE contains no classifying mark.

After the transfers performed at the point 2 of the cycle 3, the classifying mark 3501 on the card P1 is contained in the memory MBP and the classifying mark 3503 on the card S1 is contained in the memory MBS, while the memories MGP and MGS contain no classifying mark.

As a result of the transfers performed at the point 13 of the cycle 3, the classifying mark 3502 on the card P2 is contained in the memory M75, the classifying mark 3501 on the card P1 is contained in the memory M77, the classifying mark 3503 on the card S2 is contained in the memory M76, and the classifying mark 3503 on the card S1 is contained in the memory M78. It follows that the control circuits which are rendered conductive are again the circuits 226, 227, 228, 224, 225, 221 and 236. Consequently, the members which will be controlled from the point 15 of the cycle 3 are the flap 29-1, the pusher members of the storage positions 33-1 and 32-1 and the clutch members of the primary feed path and of the secondary feed path. The pulse counter KTI again remains at zero.

Since the two feed paths are again engaged, the card P1 will be introduced into the storage position 33-1 in the course of the cycle 4. The card P2 will pass under the scanning station BP2-1 in the course of the same cycle, while the card P3 will pass under the scanning station BP1-1 and the card P4 will be extracted from the hopper MP-1. At the same time, the card S1 will be introduced into the storage position 32-1 and the card S2 will pass under the scanning station BS2-1, while the card S3 will pass under the scanning station BS1-1 and the card S4 will be extracted from the hopper MS-1.

Table II shows that, after the point 4 of the cycle 4, the memory MPE contains no classifying mark and that after the point 2 of the cycle 4 the classifying mark 3502 on the card P2 is contained in the memory MBP, the classifying mark 3501 on the card P1 is contained in the memory MGP, the classifying mark 3503 on the card S1 is contained in the memory MGS, and finally the classifying mark 3503 on the card S2 is contained in the memory MBS.

Table II again shows that, after the point 2 of the cycle 4, the classifying mark 3503 on the card P3, the classifying mark 3502 on the card P2, the classifying mark 3503 on the card S3 and the classifying mark 3503 on the card S2 are contained in the memories M75, M77, M76 and M78 respectively. It follows that the control circuits which are rendered conductive are the circuits 226, 227, 228, 222, 225 and 221. Consequently, the members which will be controlled from the point 15 of the cycle 4 are the flap 29-1, the pusher member of the storage position 33-1 and the clutch members of the primary feed path and of the secondary feed path. In addition, since the control circuit 222 is conductive, the pulse counter KTI receives a pulse coming from the stud 15 and registers it.

Since the pusher member of the storage position 33-1 has just been controlled, the card P1 which is situated in the said storage position will be extracted from this position in the course of the cycle 5. Owing to the fact that the flap 29-1 has also been controlled, the card P1 thus extracted will be deflected by the said flap to the select receptacle SP-1. It will be noted that this card P1, thus separated in the course of the cycle 5, was not intended to be collated because no secondary card possessed the classifying mark 3501. Since the pusher member of the storage position 32-1 has not been controlled, the card S1 which is situated in this position will not be extracted therefrom in the course of the cycle 5. Owing to the fact that the two paths have been engaged, the card S2 will be introduced into the storage position 32-1 during the cycle 5, so that the said card S2 will be grouped with the card S1 in the said position. Simultaneously, in the course of the cycle 5, the card S3 will be scanned by the scanning station BS2-1, the card S4 will be scanned by the scanning station BS1-1 and the card S5 will be extracted from the hopper MS-1. Likewise, in the course of the cycle 5, the card P2 will be introduced into the storage position 33-1, the card P3 will be scanned by the scanning station BP2-

1, the card P4 will be scanned by the scanning station BP1–1 and the card P5 will be extracted from the hopper MP–1.

Table II indicates which classifying marks are contained in the various memories as a result of the various transfers performed in the course of the cycle 5. As a result of these transfers, the control circuits which are rendered conductive are the circuits 226, 227, 228, 222, 225 and 221. Consequently, the members which will be controlled from the point 15 of the cycle 5 are the flap 29–1, the pusher member of the storage position 33–1 and the clutch members of the primary feed path and of the secondary feed path. In addition, a pulse coming from the stud 15 and transmitted by the circuit 22 is registered by the pulse counter, which then stores two pulses.

By a reasoning similar to that already set forth in the foregoing, it will be appreciated that in the course of the cycle 6 the card P2 which is situated in the storage position 33–1 will be extracted from this position and sent into the select receptacle SP–1. Simultaneously, the card P3 will be introduced into the storage position 33–1, the cards P4 and P5 will be scanned by the scanning stations BP2–1 and BP1–1 respectively, and the card P6 will be extracted from the magazine MP–1. Likewise, the card S3 will be introduced into the storage position 32–1, the cards S4 and S5 will be scanned by the scanning stations BS2–1 and BS1–1 respectively, and the card S6 will be extracted from the hopper MS–1. Thus, at the end of the cycle 6, three cards S1, S2 and S3 will be grouped in the storage position 32–1.

Table II indicates which classifying marks are contained in the various memories as a result of the various transfers performed in the course of the cycle 6. As a result of these transfers of classifying marks, the control circuits rendered conductive are the circuits 227, 228 and 221. Consequently, the members which will be controlled from the point 15 of the cycle 6 are the pusher member of the storage position 33–1 and the clutch member of the primary feed path. In addition, the pulse counter KT1, which has received no pulse during the cycle 6, continues to store two pulses.

It will now be appreciated that, since the secondary feed path is not engaged, the secondary cards will not be driven in the course of the cycle 7. It is to be noted that, since the trigger circuit B3 has not been positioned at "1" from the point 15 of the cycle 6, the control circuits 233, 234 and 235 are not conductive. Consequently, no transfer of a classifying mark is performed between the memories M76, M78, MGS and MBS in the course of the cycle 7.

The engagement of the primary feed path in the cycle 7 and the operation of the pusher member of the storage position 33–1 enable the card P4 to be introduced into this storage position, while the card P3 extracted from the said storage position is driven towards the merge receptacle CF–1, since the flap 29–1 has not been actuated.

Table II indicates which classifying marks are contained in the various memories as a result of the various transfers performed in the course of the cycle 7. As a result of these transfers of classifying marks, the control circuits rendered conductive are the circuits 227, 228, 224, 225 and 221. Consequently, the members which will be controlled from the point 15 of the cycle 7 are the pusher members of the storage positions 33–1 and 32–1 and the clutch members of the two feed paths. At the same time, the pulse counter KTI is returned to zero owing to a pulse transmitted by the control circuit 224.

Without entering into the details of the operations performed in the course of the cycle 8 and the succeeding cycles, which may now be readily found with the aid of Table II and by reference to FIGURES 6A and 6B, it will now simply be indicated which cards are sent into the receptacles SP–1, CF–1 and SS–1 in the course of the various cycles.

In the course of the cycle 8, the card P4 is extracted from the storage position 33–1 and driven towards the merge receptacle CF–1, while the group consisting of the cards S1, S2 and S3 is driven towards this merge receptacle CF–1 after extraction from the storage position 32–1. The despatch of the cards P4, S1, S2 and S3 towards the merge receptacle CF–1 is so arranged that the cards S1, S2 and S3 are positioned above the card P4 in the merge receptacle.

In the course of the cycle 9, the card P5 is sent to the select receptacle SP–1, while the card S5 is grouped with the card S4 in the storage position 32–1.

In the course of the cycle 10, the cards P6, S4 and S5 are sent to the merge receptacle CF–1, while the cards P7 and S6 enter the storage positions.

In the course of the cycle 11, the card S6 is sent to the merge receptacle CF–1, while the card P8 is grouped with the card P7.

In the course of the cycle 12, the card S7 is sent to the merge receptacle CF–1, while the card P9 is grouped with the cards P7 and P8.

In the course of the cycle 13, only the secondary feed path is engaged and the card S9 is introduced into the storage position 32–1, while the card S8 is sent to the merge receptacle CF–1.

In the course of the cycle 14, the group consisting of the cards P7, P8 and P9 is sent to the select receptacle SP–1, while the card S10 is grouped with the card S9.

In the course of the cycle 15, the card P10 is sent to the select receptacle SP–1, while the card S11 is grouped with the cards S9 and S10.

In the course of the cycle 16, the card P11 is sent to the select receptacle SP–1, while the card S12 is grouped with the cards S9, S10 and S11.

In the course of the cycle 17, the card P12 is sent to the select receptacle SP–1, while the card S13 is grouped with the cards S9, S10, S11 and S12. It will now be noted that at the point 15 of the cycle 16 the pulse counter KTI has stored four pulses, which brings its output B to a positive potential. Consequently, the control circuit 220 becomes conductive, while the control circuit 221 is rendered non-conductive. The members which will be controlled from the point 15 of the cycle 17 are the flap 29–1, the pusher member of the storage position 33–1 and the clutch member of the primary feed path. The pulse counter KTI receives a pulse from the circuit 222, but remains positioned at its set value 4.

Consequently, in the course of the cycle 18, only the primary feed path is engaged and the card P13 is sent to the select receptacle SP–1.

In the course of the cycle 19, only the primary feed path is engaged and the card P14 is sent to the select receptacle SP–1. At the point 15 of the cycle 19, the pulse counter KTI is returned to zero.

In the course of the cycle 20, the two feed paths are engaged and the card P15 is sent to the merge receptacle CF–1 after extraction from the storage position 33–1, while at the same time the group consisting of the cards S9, S10, S11, S12 and S13 is sent to the merge receptacle CF–1 after extraction from the storage position 32–1.

In the course of the cycle 21, only the secondary feed path is engaged and the card S14 is sent to the merge receptacle CF–1.

In the course of the cycle 22, only the secondary feed path is engaged and, since the flap 28–1 is actuated, the card S15 is sent to the select receptacle SS–1.

Similarly, in the course of the cycle 23, the card S16 is sent to the select receptacle SS–1.

In the course of the cycle 24, only the primary feed path is engaged and the card P16 is sent to the select receptacle SP–1.

In the course of the cycle 25, only the primary feed path is engaged and the card P17 is sent to the merge receptacle CF–1.

In the course of the cycle 26, the two feed paths are engaged and the cards P18 and P17 are simultaneously sent to the merge receptacle CF–1.

Finally, in the course of the cycle 27, the two feed paths are engaged and the remaining card P19 is sent to the select receptacle SP–1. Since neither of the memories MGP and MGS contains any classifying marks, the output of the AND circuit 203 is brought to a positive potential, whereby the control circuit 236 is rendered conductive. The pulse transmitted by this circuit at the point 13 of the cycle 27 energises the electromagnet RA which, by breaking the holding circuit of the electromagnet RM, stops the machine.

Ultimately, the cards P1, P2, P5, P7, P8, P9, P10, P11, P12, P13, P14, P16 and P19 are in the select receptacle SP–1, and the cards S15 and S16 are in the select receptacle SS–1. Finally, the cards P3, P4, S1, S2, S3, P6, S4, S5, S6, S7, S8, P15, S9, S10, S11, S12, S13, S14, P17, P18 and S17 are collated in that order in the merge receptacle CF–1.

All these operations are performed in 27 cycles, owing to the use of a group merge collator. It may here be noted by way of comparison that the use of a simultaneous merge collator for merging two preceding card index systems would have required 32 cycles, assuming that the classifying marks on the cards had been scanned, which calls for about 35 cycles.

It is to be understood that the saving of cycles which can be effected with a group merge collator is variable and depends essentially upon the composition of the two card index systems to be collated. On average, this saving is of the order of 15% to 20% in the case of a collator provided with one storage position in each of its feed paths. However, this percentage may be greatly improved by providing a number of storage positions disposed in the feed paths, so that the simultaneous operation of these feed paths is interrupted to a minimum extent.

The characteristic features of the invention will be more clearly apparent from the following claims.

I claim:

1. In a collating machine for selecting and collating primary and secondary cards bearing classifying marks, comprising a primary card hopper, a secondary card hopper, a plurality of receiving receptacles comprising select receptacles for receiving uncollated cards and at least one merge receptacle for receiving primary and secondary cards collated in accordance with a predetermined relation of their classifying marks, first feed advance means forming a primary feed path and disposed between the said primary card hopper and the said receiving receptacles for advancing the said primary cards towards the receiving receptacles, second feed advance means forming a secondary feed path and disposed between the said secondary card hopper and the said receiving receptacles for advancing the said secondary cards towards the receiving receptacles, scanning means disposed in each of the said feed paths, comparing means connected to the said scanning means to compare the classifying marks on the cards advanced along the said feed paths, also as means for controlling the first feed advance means and means for controlling the second feed advance means each controlled by the said comparing means, a card storage station disposed between the scanning means of one of the said feed paths and the receiving receptacles, the said storage station comprising a position for accumulating cards fed into it, of which the classifying marks conform to another predetermined condition of comparison with the classifying marks of the cards fed along the other feed path, the said storage station comprising in addition means for ejecting all together, towards a receiving receptacle, cards accumulated in the said position, and control means for controlling the said ejection means in dependence upon indications supplied by the said comparing means.

2. In a collating machine for selecting and collating primary and secondary cards bearing classifying marks, comprising a primary card hopper, a secondary card hopper, a plurality of receiving receptacles comprising select receptacles for receiving uncollated cards and at least one merge receptacle for receiving primary and secondary cards collated in accordance with a predetermined relation of their classifying marks, first feed advance means forming a primary feed path and disposed between the said primary card hopper and the said receiving receptacles for advancing the said primary cards towards the receiving receptacles, second feed advance means forming a secondary feed path and disposed between the said secondary card hopper and the said receiving receptacles for advancing the said secondary cards towards the receiving receptacles, card scanning means disposed in each of the said feed paths, comparing means connected to the said scanning means for comparing the classifying marks on the cards fed along the said feed paths, means for controlling the first feed advance means and means for controlling the second feed advance means, each controlled by the said comparing means, two card storage stations each disposed in one of the said feed paths, each storage station being located between the scanning means of one feed path and the receiving receptacles and comprising a position for accumulating cards bearing like classifying marks which are advanced along the said feed path, in accordance with the classifying marks on the said cards and in relation with the classifying marks on the cards advanced along the other feed path, each storage station comprising in addition card ejection means for ejecting all together, towards a receiving receptacle, the cards accumulated in its position, and control means for controlling the said ejection means in dependence upon indications supplied by the aforesaid comparing means.

3. A collating machine for selecting and collating primary and secondary cards bearing classifying marks, comprising a primary card hopper, a secondary card hopper, a plurality of receiving receptacles comprising select receptacles for receiving uncollated cards and at least one merge receptacle for receiving primary and secondary cards collated in accordance with a predetermined relation of their classifying marks, a primary card feed path including first feed advance means disposed between the said primary card hopper and the said receiving receptacles for advancing the said primary cards towards the receiving receptacles, a secondary card feed path including second feed advance means disposed between the said secondary card hopper and the said receiving receptacles for advancing the said secondary cards towards the receiving receptacles, card reading means disposed in each of the said feed paths, comparing means connected to the said reading means for comparing the classifying marks on the cards advanced along the said feed paths, means for controlling the first feed advance means and means for controlling the second feed advance means, each controlled by the said comparing means, and a card storage station disposed between the reading means of one of the said feed paths and the receiving receptacles, the said storage station comprising a position for accumulating cards bearing like classifying marks, introduction checking means for checking the number of cards introduced into the said position, means for ejecting the accumulated cards all together towards a receiving receptacle, and means for controlling the said ejection means, operating in dependence upon indications supplied by the aforesaid comparing means, the said means for controlling the feed advance means associated with the said feed path being connected in addition to the said introduction checking means for receiving an indication when the number of cards introduced into the said position is equal to a predetermined maximum number, cards being accumulated in the said storage position in accordance with their classifying marks, in relation with the classifying marks of the cards advanced along the other feed path.

4. A collating machine for selecting and collating primary and secondary cards bearing classifying marks, the said machine comprising a primary card hopper, a secondary card hopper, a plurality of receiving receptacles comprising select receptacles for receiving uncollated cards and at least one merge receptacle for receiving primary and secondary cards collated in accordance with a predetermined relation of their classifying marks, first feed advance means forming a primary feed path and disposed between the said primary card hopper and the said receiving receptacles for advancing the said primary cards towards the receiving receptacles, second feed advance means forming a secondary feed path and disposed between the said secondary card hopper and the said receiving receptacles for advancing the said secondary cards towards the receiving receptacles, card scanning means disposed in each of the said feed paths, comparing means connected to the said scanning means for comparing the classifying marks on the cards advanced along the said feed paths, means for controlling the first feed advance means and means for controlling the second feed advance means, each controlled by the said comparing means, and two card storage stations, each being disposed in an associated feed path and located between the scanning means of one feed path and the receiving receptacles, each station comprising a position for accumulating cards bearing like classifying marks which are advanced along the said feed path, in accordance with the classifying marks on these cards and in relation with the classifying marks on the cards advanced along the other feed path, each storage station comprising in addition introduction checking means for checking the number of cards introduced into the said position, card ejection means for ejecting the accumulated cards all together towards a receiving receptacle, and control means for controlling the said ejection means in dependence upon indications supplied by the aforesaid comparing means, the means for controlling the feed advance means of one feed path being connected in addition to the introduction checking means of the storage station of this feed path in order to receive an indication when the number of cards introduced into the said station is equal to a predetermined maximum number.

5. A collating machine for selecting and collating primary and secondary cards bearing classifying marks, the said machine comprising a primary card hopper, a secondary card hopper, a plurality of receiving receptacles comprising select receptacles for receiving uncollated cards and at least one merge receptacle for receiving primary and secondary cards collated in accordance with a predetermined relation of their classifying marks, first feed advance means forming a primary feed path and disposed between the said primary card hopper and the said receiving receptacles for advancing the said primary cards towards the receiving receptacles, second advance means forming a secondary feed path and disposed between the said secondary card hopper and the said receiving receptacles for advancing the said secondary cards towards the receiving receptacles, scanning means disposed in each of the feed paths, comparing means connected to the said scanning means for comparing the classifying marks on the cards advanced along the said feed paths, means for controlling the first feed advance means and means for controlling the said second feed advance means, each controlled by the said comparing means, and at least one card storage position disposed in each feed path, each storage position being located between the scanning means of one feed path and the receiving receptacles and comprising a position for accumulating cards bearing like classifying marks which are advanced along the said feed path, in a longitudinal direction, in accordance with the classifying marks on these cards and in relation with the classifying marks on the cards advanced along the other feed path, each storage position comprising in addition a fixed stop for stopping the cards introduced into the said position, card ejection means for ejecting all together, towards a receiving receptacle and in a transverse direction, the cards accumulated in the said position, and control means for controlling the said ejection means, operating in dependence upon indications supplied by the aforesaid comparing means.

6. A collating machine according to claim 5, wherein each storage position comprises in addition introduction checking means for checking the number of cards introduced, the means for controlling the feed advance means of the feed path in which the said storage position is disposed being connected in addition to the said introduction checking means, to receive an indication when the number of cards introduced into the said position is equal to a predetermined maximum number.

References Cited by the Examiner

UNITED STATES PATENTS

| | | | |
|---|---|---|---|
| 2,379,828 | 7/1945 | Rubidge | 270—58 |
| 2,496,124 | 1/1950 | Ferry | 209—110 |

EUGENE R. CAPOZIO, *Primary Examiner.*

R. E. KLEIN, *Assistant Examiner.*